(12) United States Patent
Sakakibara et al.

(10) Patent No.: US 6,494,051 B2
(45) Date of Patent: Dec. 17, 2002

(54) HOT WATER SUPPLY SYSTEM

(75) Inventors: Hisayoshi Sakakibara, Nishio (JP); Shin Nishida, Anjo (JP); Masahiko Ito, Nagoya (JP); Kenichi Fujiwara, Kariya (JP); Tomoaki Kobayakawa, Tokyo (JP); Kazutoshi Kusakari, Tokyo (JP); Michiyuki Saikawa, Tokyo (JP)

(73) Assignees: Denso Corporation, Kariya (JP); Tokyo Electric Power Company, Tokyo (JP); Central Research Institute of Electric Power Industry, Tokyo (JP)

( * ) Notice: Subject to any disclaimer, the term of this patent is extended or adjusted under 35 U.S.C. 154(b) by 0 days.

(21) Appl. No.: 09/969,249

(22) Filed: Oct. 1, 2001

(65) Prior Publication Data

US 2002/0014085 A1 Feb. 7, 2002

Related U.S. Application Data

(62) Division of application No. 09/441,965, filed on Nov. 17, 1999, now Pat. No. 6,370,896.

(30) Foreign Application Priority Data

Nov. 18, 1998 (JP) ............................................. 10-328538
Sep. 17, 1999 (JP) ............................................. 11-264336

(51) Int. Cl.$^7$ ........................... F25B 41/04; F25B 43/00
(52) U.S. Cl. ............................... 62/225; 62/503; 62/513
(58) Field of Search ............................... 62/513, 238.6, 62/238.7, 503, 196.1, 225

(56) References Cited

U.S. PATENT DOCUMENTS

2,624,179 A  * 1/1953 Daisy ........................ 62/513 X
4,205,532 A    6/1980 Brenan ........................ 62/115

FOREIGN PATENT DOCUMENTS

| JP | U-58-28260 | 2/1983 |
| JP | A-60-250 | 1/1985 |
| JP | A-62-108970 | 5/1987 |
| JP | A-1-193561 | 8/1989 |
| JP | A-3-84359 | 4/1991 |
| JP | A-6-73652 | 10/1994 |
| JP | A-9-236316 | 9/1997 |
| JP | A-9-264632 | 10/1997 |
| JP | A-10-288411 | 10/1998 |

* cited by examiner

*Primary Examiner*—William Wayner
(74) *Attorney, Agent, or Firm*—Harness, Dickey & Pierce, PLC

(57) ABSTRACT

A hot water supply system wherein a flow of a refrigerant on a high-pressure side of a supercritical heat pump cycle and a flow of hot water are oppositely directed, and wherein water heated by the refrigerant on the high-pressure side is stored in heat insulating tanks of a vacuous and double structure. Water is heated with heat absorbed from the atmosphere and by the supercritical heat pump cycle having a high heat exchange efficiency η, to reduce the power required to heat the water. Therefore, hot water can be generated even in the daytime during peak power rates. Accordingly, because it is unnecessary to store hot water for daytime use in insulated tanks, system space requirements are reduced.

8 Claims, 22 Drawing Sheets

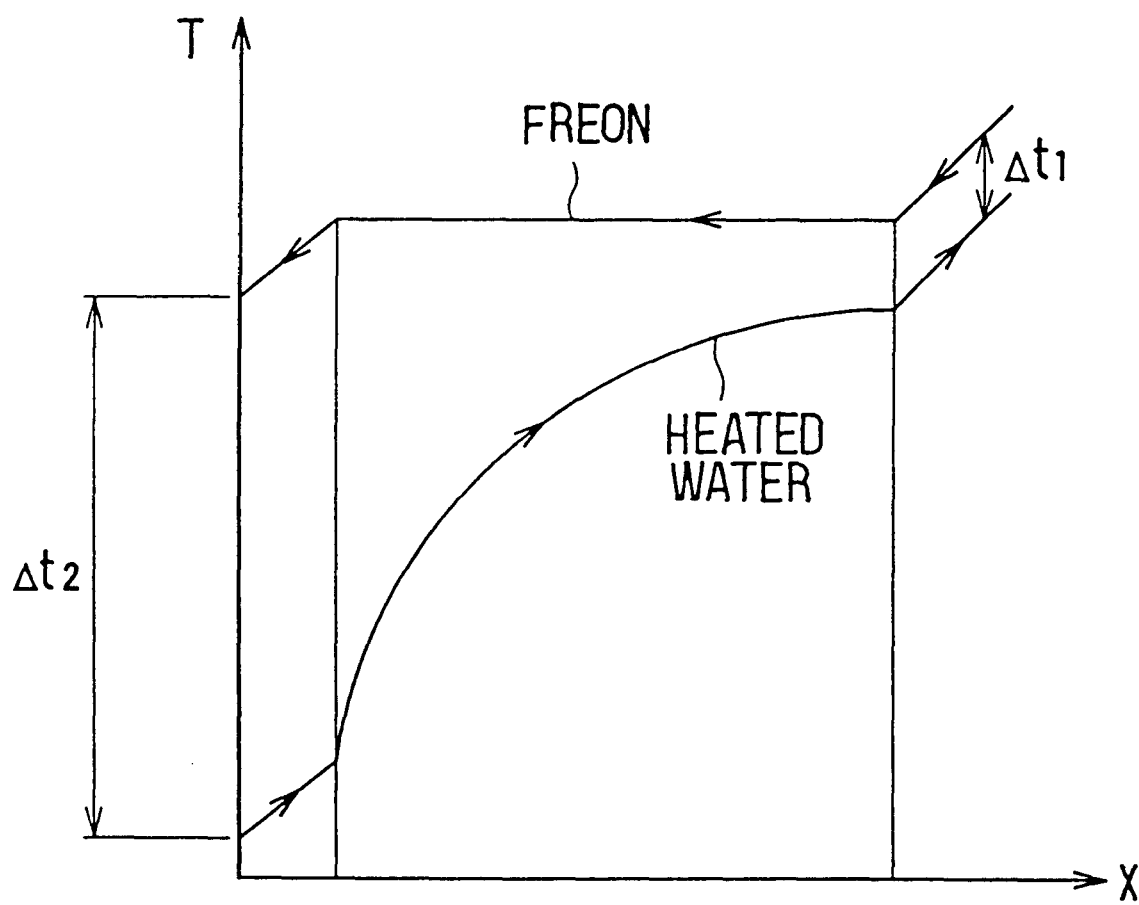

HOT WATER SUPPLY SYSTEM

CROSS-REFERENCE TO RELATED APPLICATIONS

This is a division of U.S. patent application Ser. No. 09/441,965, filed Nov. 17,1999, now U.S. Pat. No. 6,370, 896.

The present application is related to, and claims priority from, Japanese Patent Application Nos. Hei. 10-328538 and 11-264336, the contents of which are incorporated herein by reference.

BACKGROUND OF THE INVENTION

1. Field of the Invention

This invention relates generally to a hot water supply system, and particularly to a system that heat exchanges water with a heated refrigerant in a heat exchanger while maintaining a difference in temperature between refrigerant exhausted from the heat exchanger and water input into the heat exchanger within a predetermined temperature range.

2. Related Art

A typical hot water supply system is described in, for example, Japanese Utility Model Laid-Open No. Hei. 6-73652. In the described system, water is heated by an electric heater and is then stored in a heat insulating tank. As the water must be heated by the electric heater, overall system power requirements are increased. Therefore, such a hot water supply system generates hot water at night to minimize electricity costs.

SUMMARY OF THE INVENTION

Therefore, it is an object of the present invention to provide a hot water supply system in which the amount of power required to generate hot water is reduced.

The present invention provides a heating system in which a refrigerant flow on a high-pressure side of a heat pump cycle and a hot water flow are opposite one another. Water heated by the high-pressure side refrigerant is stored in heat insulating tanks.

In the above-described arrangement, water is heated by heat absorbed from the atmosphere and by a supercritical heat pump cycle of high heat exchange efficiency, so that power required to heat the water can be minimized. Therefore, it is possible to generate hot water by using a minimum amount of power, as hot water may be generated when demand so requires, without the need for storing hot water for daytime use. Moreover, as heat insulating tanks are not required for storing water heated during nighttime hours for daytime use, a much smaller-scale hot water supply system can be implemented.

BRIEF DESCRIPTION OF THE DRAWINGS

FIG. 6 is a graph showing temperature variation in a water heat exchanger using freon as a refrigerant;

DETAILED DESCRIPTION OF THE PREFERRED EMBODIMENTS (First Embodiment)

Figure 1:
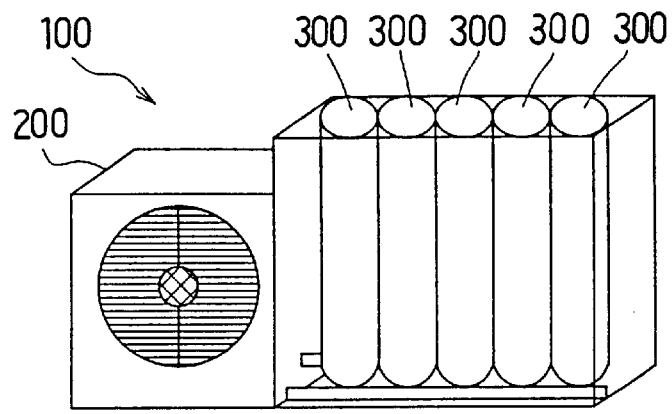
FIG. 1 is a perspective view of a first embodiment of the hot water supply system according to the present invention.
Figure 2:
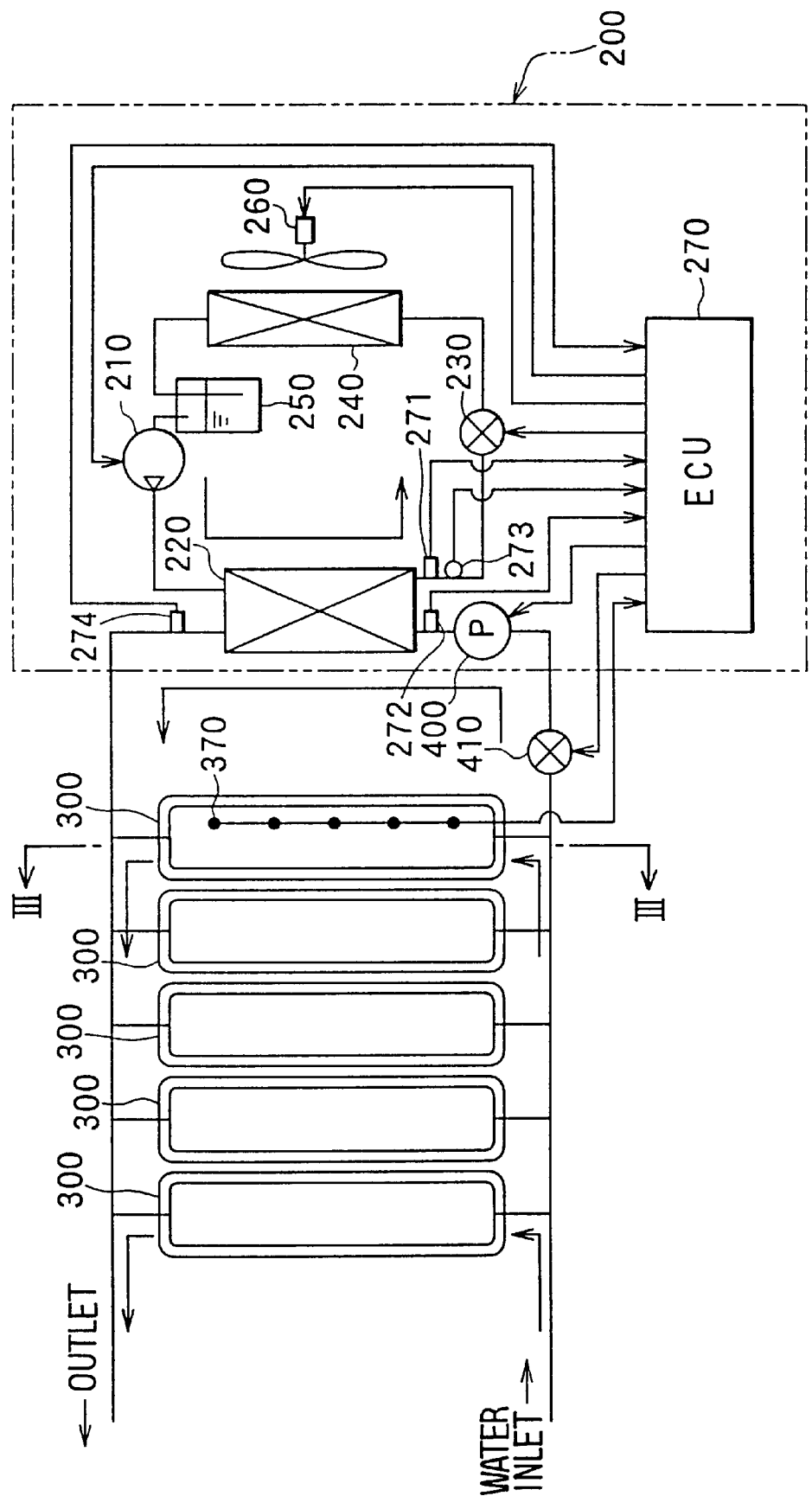
FIG. 2 is a schematic diagram of the system shown in FIG. 1.

In the first embodiment of the present invention, a hot water supply system 100 for household use is shown in FIGS. 1 and 2. In FIG. 2, reference numeral 200 denotes a supercritical heat pump cycle 11 ("heat pump") adapted to heat water to a high temperature (about 85° C.) for use as a hot water generating fluid. The supercritical heat pump cycle is a heat pump cycle in which a refrigerant pressure on the high-pressure side becomes greater than or equal to a critical pressure of the refrigerant, and in which, for example, carbon dioxide, ethylene, ethane or nitrogen oxide is used as a refrigerant. Reference numeral 300 denotes a plurality of heat insulating tanks for storing the water heated by the heat pump 200. The heat insulating tanks 300 are arranged to extend in parallel with a flow of hot water.

Referring to FIG. 2, the heat pump 200 will now be described in more detail. A compressor 210 for sucking and compressing a refrigerant (carbon dioxide in the present embodiment) is an electric compressor comprising a unitary combination of a compression mechanism (not shown) for sucking and compressing the refrigerant, and an electric motor (not shown) for driving the compression mechanism. A water heat exchanger (radiator) 220 heat exchanges the refrigerant flowing out from the compressor 210 and supplied water. The water heat exchanger 220 is a counterflow type heat exchanger formed so that a refrigerant flow is opposite that of a flow of water.

An electric expansion valve 230 decompresses the refrigerant flowing out from the water heat exchanger 220, and an evaporator 240 evaporates the refrigerant flowing out from the electric expansion valve 230 so that the refrigerant can absorb atmospheric heat before it is sent to an accumulator 250 (suction side of the compressor 210) to be described later. An accumulator separates the refrigerant, which flows out from the evaporator 240, into a gas phase refrigerant and a liquid phase refrigerant, before sending the gas phase refrigerant to the suction side of the compressor 210 and storing excess refrigerant in the heat pump 200.

A blower 260 blows ambient air to the evaporator 240, and is capable of regulating an air flow rate. The blower 260, the compressor 210 and the expansion valve 230 are controlled by an electronic control unit (ECU) 270 based on detected signals from various sensors which will be described later. A refrigerant temperature sensor 271 detects the temperature of the refrigerant flowing from the water heat exchanger 220. A first water temperature sensor 272 detects the temperature of the water flowing into the water heat exchanger.

A refrigerant pressure sensor 273 detects the pressure of the refrigerant flowing out of the water heat exchanger 220, and a second water temperature sensor 274 detects the temperature of the hot water flowing from the water heat exchanger 220. The detected signals from the sensors 271–274 are input into the ECU 270.

The refrigerant pressure on the high-pressure side referred to above is a refrigerant pressure existing in a refrigerant passage extending from a discharge side of the compressor 210 to an inflow side of the expansion valve 230, and is substantially equal to a discharge pressure (inner pressure of the water heat exchanger 220) of the compressor 210. The refrigerant pressure on the low-pressure side is present in a refrigerant passage extending from a discharge side of the expansion valve 230 to a suction side of the compressor 210, and is substantially equal to a suction pressure of the compressor 210.

An electric water pump 400 supplies a regulated amount of hot water to the water heat exchanger 220, and a shutoff valve 410 prevents tap water supplied from a water pipe (not shown) from flowing into the water heat exchanger 220. Both the pump 400 and shutoff valve 410 are controlled by the ECU 270.

Figure 3:
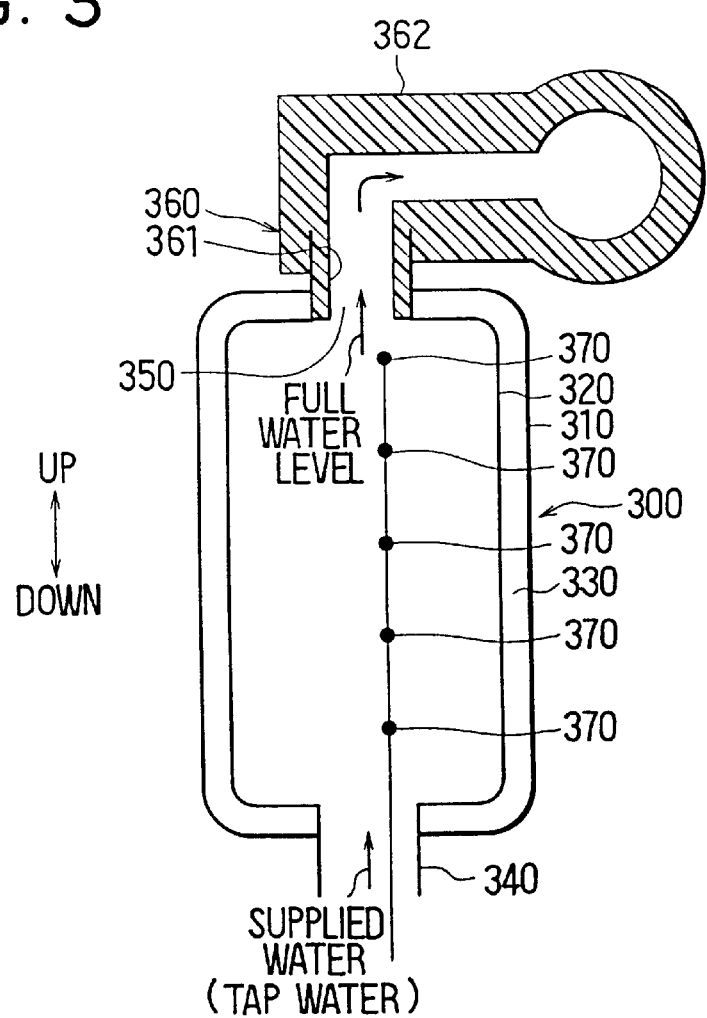
FIG. 3 is a sectional view taken along line III—III in FIG. 2.

Referring now to FIG. 3, the heat insulating tanks 300 will now be described. The tank shown in FIG. 3 has a double tank structure comprising outer and inner tank members 310, 320 made from a high corrosion resistance metal, such as stainless steel, and a hollow space 330 between the inner tank member 320 in which hot water is stored and the outer tank member 310 is kept substantially vacuous.

The heat insulating tank 300 is provided at a lower portion thereof with a first opening 340 into which tap water flows, or from which the cold water in the insulating tank 300 flows out toward the water heat exchanger 220. The heat insulating tank 300 is provided at an upper portion thereof with a second opening 350 from which the hot water in the heat insulating tank 300 flows, or into which the water heated in the water heat exchanger 220 flows.

The second opening 350 is provided with a heat insulating portion 360 for preventing the heat of the hot water stored in the heat insulating tank 300 from being discharged from the second opening 350 to the exterior (atmosphere). The heat-insulating portion 360 has a first pipe section 361 extending through the second opening 350 and into the interior of the inner tank member 320, and a second pipe section 362 extending from the first pipe section 361 to a pipe (not shown) joined to the second opening 350. The two pipe sections 361, 362 are formed to an integral body by a low heat transfer rate resin.

At least one of the heat insulating tanks 300 is provided with a plurality of temperature sensors 370, which detect the temperature of the hot water therein, so that they are vertically spaced from one another. The temperatures detected by these temperature sensors 370 are also input into the ECU 270.

The operation of the hot water supply system 100 of this embodiment will now be described.

Figure 4C:
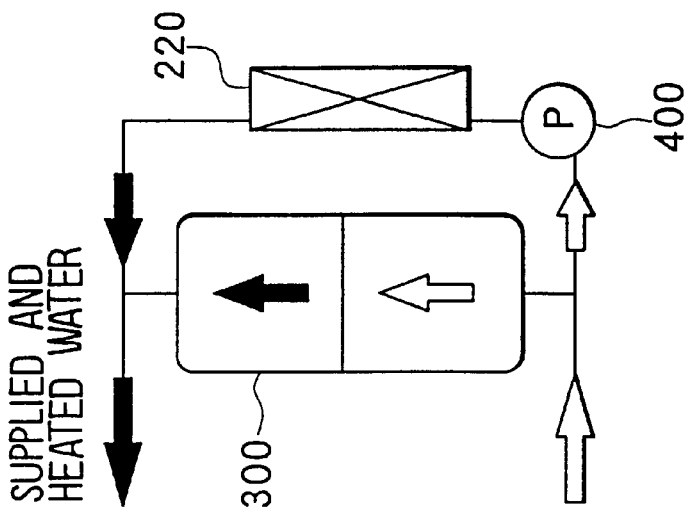
FIGS. 4A–4C are schematic diagrams showing operation of the first embodiment.
Figure 4B:
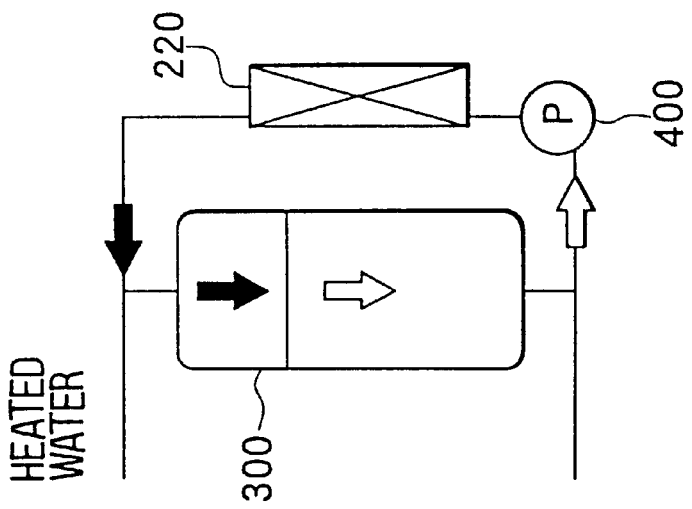
Figure 4A:
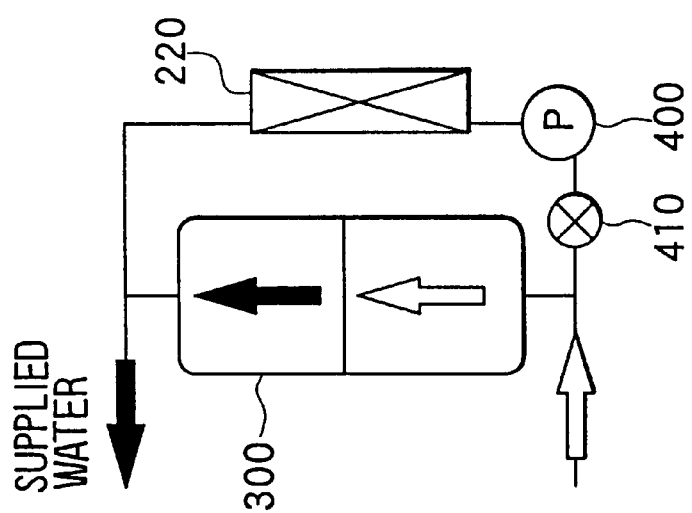

1. Hot water supplying operation:

1-1—Hot water stored in the heat insulating tanks is supplied:

Referring to FIG. 4A, when a hot water supply faucet (not shown) joined to the side of the hot water supply system 100 (second openings 350 of the heat insulating tanks 300) is opened, the shutoff valve 410 is closed, and tap water is supplied to the heat insulating tanks 300.

Consequently, the hot water stored in the heat insulating tanks 300 is forced out by the supplied tap water, and the hot water thus forced out is supplied from a hot water supply faucet.

1-2—Hot water temperature in the heat insulating tanks 300 decreases (the hot water is reheated):

As shown in FIG. 4B, when the temperature of the hot water in the heat insulating tanks 300 is determined to be less than or equal to a predetermined level with reference to detected signals from the temperature sensors 370, or when the volume of hot water is determined to be less than or equal to a predetermined quantity, the shutoff valve 410 is opened to operate the pump 400 and heat pump 200. Consequently, the hot water heated by the heat pump 200 flows into the heat insulating tanks 300.

1-3—The hot water is re-heated as hot water is supplied:

As shown in FIG. 4C, the hot water supply faucet is opened to supply tap water to the heat insulating tanks 300, while the shutoff valve 410 is opened to operate the pump 400 and heat pump 200. Consequently, the hot water in the heat insulating tanks 300 and the water heated by the heat pump 200 are supplied.

2. Operation of the heat pump 200:

When the compressor 210 is operated, the refrigerant is circulated in the heat pump 200. Since the refrigerant discharged from the compressor 210 at this time has been pressurized to a pressure greater than or equal to a critical level, it is circulated in the water heat exchanger 220 without being condensed with a temperature gradient that is lowered gradually from a refrigerant inlet toward a refrigerant outlet.

Since the water heat exchanger 220 is formed so that a refrigerant flow and a flow of water to be supplied are oppositely directed, the water to be supplied is heated in the water heat exchanger 220, with its temperature increasing gradually from a water inlet toward a water outlet.

The refrigerant decompressed by the expansion valve 230 absorbs heat from the atmosphere and is evaporated in the evaporator 240, and the evaporated refrigerant is then sucked into the compressor 210 through the accumulator 250. In this embodiment, hot water of a temperature greater than or equal to 85° C. is supplied by the hot water supply system 100 (heat pump 200). Therefore, it is necessary during operation of the heat pump 200 that the temperature of the refrigerant at the refrigerant inlet of the water heat exchanger 220 be set to greater than or equal to 85° C. In the present embodiment, the required refrigerant temperature is preferably set to about 100° C. The temperature of the hot water to be supplied at the hot water outlet of the water heat exchanger 220 can be controlled by the pump 400 to a set level by regulating the quantity of the hot water to be supplied.

In the present embodiment, the degree of opening of the expansion valve 230, rotational frequency of the compressor 210 and flow rate of the blower 260 are controlled so that a discharge pressure Pd (refrigerant pressure on the high-pressure side) of the compressor 210 reaches a refrigerant pressure corresponding to the required refrigerant temperature at the refrigerant inlet of the water heat exchanger 220.

When the discharge pressure Pd is lower than a predetermined level Po (about 15 MPa in the present embodiment), it is controlled so that a temperature difference $\Delta T$ between the refrigerant flowing out from the water heat exchanger 220 and water flowing thereinto reaches a level in a predetermined temperature range centering around a predetermined temperature difference $\Delta T_0$. (about 10° in this embodiment).

When the temperature difference $\Delta T$ is larger than the predetermined temperature difference $\Delta T_0$, the degree of opening of the expansion valve 230 is reduced. The rotational frequency of the compressor 210 and airflow rate of the blower 260 may further be Increased. The temperature difference $\Delta T$ is reduced by increasing the discharge pressure Pd in this manner.

When the degree of opening of the expansion valve 230 is reduced, a flow passage resistance of the refrigerant increases, so that the pressure of the refrigerant on the high-pressure side discharged from the compressor 210 increases. When the airflow rate of the blower 260 is increased, the transmission of heat from the outside air to the refrigerant is enhanced, so that the refrigerant pressure on the low-pressure side increases. Consequently, a suction rate of the refrigerant per unit time of the compressor 210 increases to cause the refrigerant pressure on the high-pressure side to increase. Increasing the rotational frequency of the compressor 210 is also effective in increasing the refrigerant pressure on the high-pressure side. However, when the refrigerant pressure on the high-pressure side is increased by increasing the rotational frequency of the compressor 210, the airflow rate of the blower 260 is also preferably simultaneously increased.

When the rotational frequency of the compressor 210 is merely increased without varying the airflow rate thereof, a suction rate of the refrigerant increases but the refrigerant pressure on the low-pressure side decreases in consequence. Therefore, a mere increase in the rotational frequency of the compressor 210 only minimally increases the refrigerant pressure on the high-pressure side. Increasing the refrigerant pressure on the low-pressure side by increasing the airflow rate of the blower 260 enables the compressor 210 to suck the refrigerant thereinto sufficiently to increase the refrigerant pressure on the high-pressure side.

When the discharge pressure Pd has reached a predetermined level Po, the refrigerant pressure on the low-pressure side is controlled so that the temperature difference $\Delta T$ reaches a level in a predetermined range around the predetermined temperature difference $\Delta T_0$. Specifically, the airflow rate of the blower is reduced, and the rotational frequency of the compressor 210 may further be increased. Thus, the refrigerant pressure on the low-pressure side is reduced.

When the airflow rate of the blower 260 is reduced, the quantity of heat transmitted from the outside air to the refrigerant decreases in contrast with the above-described example, so that the refrigerant pressure in the evaporator, i.e. the refrigerant pressure on the low-pressure side, decreases. Increasing the rotational frequency of the compressor 210 is also effective as mentioned above in reducing the refrigerant pressure on the low-pressure side.

The characteristics of the present embodiment will now be described. First, in order to have the following description understood easily, the heat exchange rate $\eta$ of a counterflow type heat exchanger will be described.

Figure 5A:
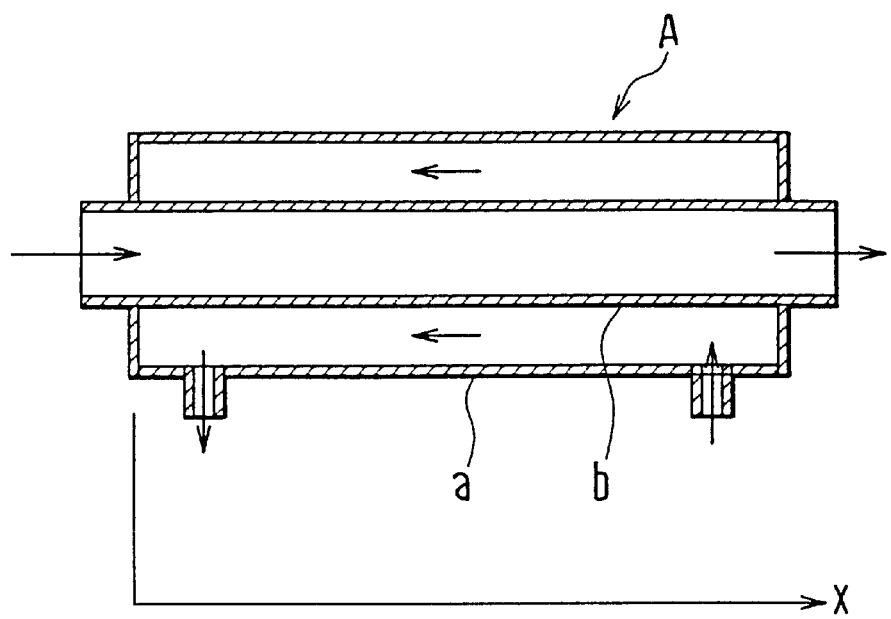
FIG. 5A is top plan cross-sectional view of a counterflow-type heat exchanger used in the first embodiment.
Figure 5B:
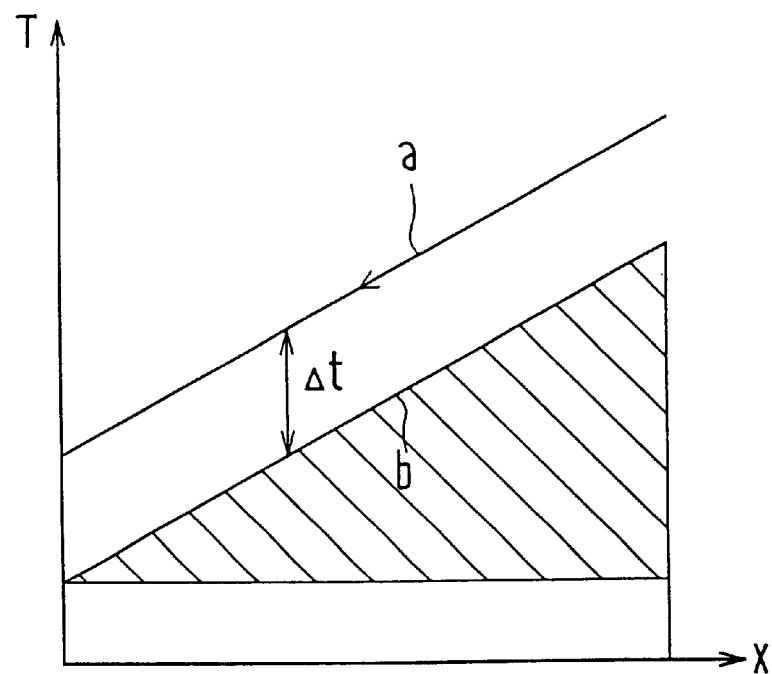
FIG. 5B is a graph showing temperature variation versus flow distance in the counterflow type heat exchanger.

FIG. 5A is a schematic diagram of a counterflow type heat exchanger A, in which a heat exchanger fluid and a fluid to be heat-exchanged have oppositely-directed flowpaths. If high-temperature water a and low-temperature water b flow in outer and inner cylinders a, b respectively, the respective temperatures of the water a, b vary with a substantially equal difference $\Delta T$ maintained as shown in FIG. 5B. Since the lateral axis x of FIG. 5B represents a distance based on the position of a water inlet of the inner cylinder b, the quantity of heat Q transferred from the water a to the water b in the heat exchanger A varies in proportion to the area of the triangular hatched portion shown in FIG. 5B.

A quotient obtained by dividing a quantity of heat Q transferred to the fluid to be heat-exchanged (water b) by an average temperature difference $\Delta t$ between the heat exchanger fluid (water a) and the fluid to be heat-exchanged is defined as heat exchange efficiency $\eta(Q/\Delta t)$. As is clear from this definition, a heat exchanger of a larger heat exchange efficiency $\eta$ is capable of obtaining a larger heat exchange amount with a smaller temperature difference.

A heat exchange efficiency $\eta$ of the water heat exchanger 220 will now be discussed in accordance with the above definition of heat exchange efficiency $\eta$.

In the heat pump 200, the refrigerant pressure on the high-pressure side is greater than or equal to a critical level. Accordingly, in the water heat exchanger 220, the refrigerant varies (decreases) in temperature alone without encountering the phase variation thereof.

Therefore, the temperature of the refrigerant varies substantially linearly with respect to the quantity of heat given to or removed from the refrigerant, in the same manner as when the refrigerant is in a gas phase or a liquid phase. Namely, assuming that the specific entropy of the refrigerant and refrigerant temperature vary substantially linearly, the temperature variations of the refrigerant and hot water become substantially identical to the parameters shown in FIG. 5B.

A case where the heat pump 200 filled with a refrigerant comprising freon used at a pressure lower than a critical pressure is operated will now be studied.

The freon varies in phase (condenses) at a constant temperature in a two-phase region, i.e., in a gas-liquid phase region, and the specific entropy and temperature thereof vary substantially linearly in a heated vapor region and an over-cooled region.

When a temperature difference between the freon and hot water in a heated vapor region, i.e. a temperature difference between the temperature of hot water at the hot water outlet side of the water heat exchanger 220 and the temperature of the freon at the refrigerant inlet side thereof is set to $\Delta t_1$, the hot water temperature varies exponentially in the gas-liquid phase region as shown in FIG. 6. Therefore, in order to conduct heat exchange reliably between the freon and hot water in the water heat exchanger 220, it is necessary that a temperature difference $\Delta t_2$ between the water inlet side and refrigerant inlet side be set sufficiently high as compared with the temperature difference $\Delta t_1$.

Therefore, when a heat pump 200 containing a refrigerant comprising freon used at a pressure lower than a critical pressure is operated, the heat exchange efficiency $\eta$ decreases as compared with that in the present embodiment in which the heat pump 200 filled with a refrigerant, such as carbon dioxide, used at a pressure greater than or equal to a critical level, is operated.

In the hot water supply system 100 in this embodiment, water is heated with the heat absorbed from the atmosphere, and by the supercritical heat pump cycle 200 of a high heat exchange efficiency $\eta$, so that the amount of electric power required to heat water can be minimized.

Moreover, since hot water can be generated even in the daytime during peak power fee rates, it is unnecessary to store hot water for daytime use in large heat insulating tanks. Accordingly, the hot water supply system 100 can be installed in a smaller spaces than conventional heating systems.

Figure 7:
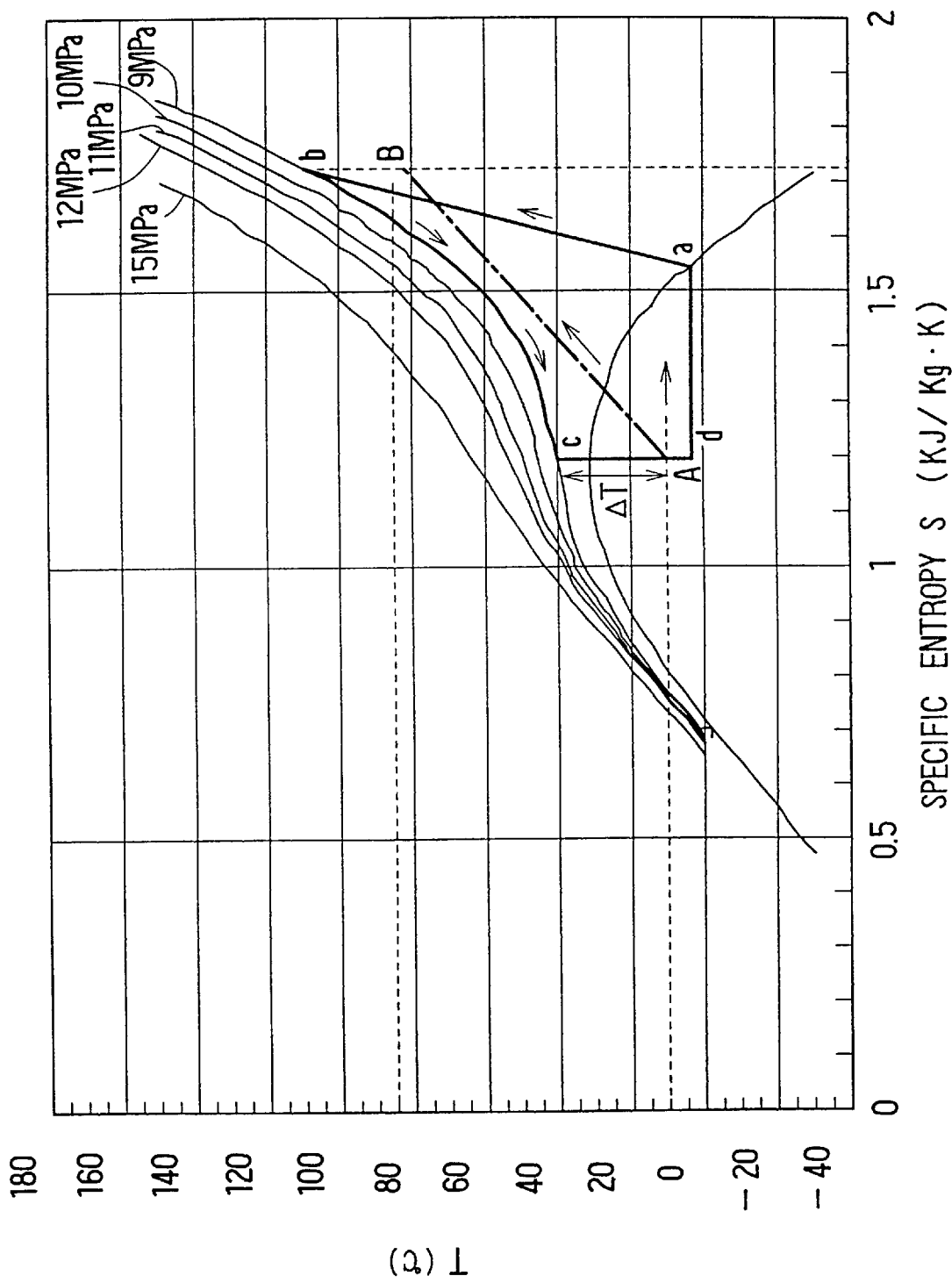
FIG. 7 is a graph of T(temperature) vs. S(specific entropy) for refrigerant used in the system of the present invention.

Referring to FIG. 7, although the above description is given based on the assumption that the specific entropy and temperature of the refrigerant vary linearly, the specific entropy and the refrigerant temperature practically varies so as to increase non-linearly in accordance with an increase in the specific entropy thereof. As is clear from FIG. 7, the graph showing the relation between the specific entropy of the refrigerant and the temperature thereof indicates that the property of the refrigerant varies in accordance with the pressure thereof, and that, as the refrigerant pressure increases, the relation between the specific entropy of the refrigerant and the temperature thereof comes close to a linearly varying condition.

As is clear from the above description, the heat exchange efficiency $\eta$ can be increased when the specific entropy of the refrigerant and temperature thereof vary linearly, so that, when the refrigerant pressure, i.e. the discharge pressure Pd, is increased, the heat exchange efficiency $\eta$ can be increased.

Therefore, in this embodiment, the discharge pressure Pd is controlled so that the temperature difference $\Delta T$ between the refrigerant flowing from the water heat exchanger 220 and the hot water flowing thereinto reaches a predetermined level $\Delta T_0$ to improve the heat exchange efficiency $\eta$. The reasons why such techniques are used will now be given.

The solid lines a-b-c-d in FIG. 7 form a heat pump cycle diagram during a period of time in which the heat pump 200 is stable in a certain condition (discharge pressure Pd=9 Mpa).

Referring to the chart, line segment a-b indicates a compression stroke, line segment b-c a change in the interior of the water heat exchanger, line segment c-d a decompression stroke, line segment d-a an evaporation stroke, and broken line A-B a change of hot water in the water heat exchanger.

When the discharge pressure Pd is increased from 9 MPa to 11 MPa, the heat exchange efficiency $\eta$ is improved to cause a heat exchange rate in the water heat exchanger 220 to increase. Consequently, the temperature and specific entropy of the refrigerant on the refrigerant outlet side of the water heat exchanger 220 decrease as shown in FIG. 8.

Figure 8:
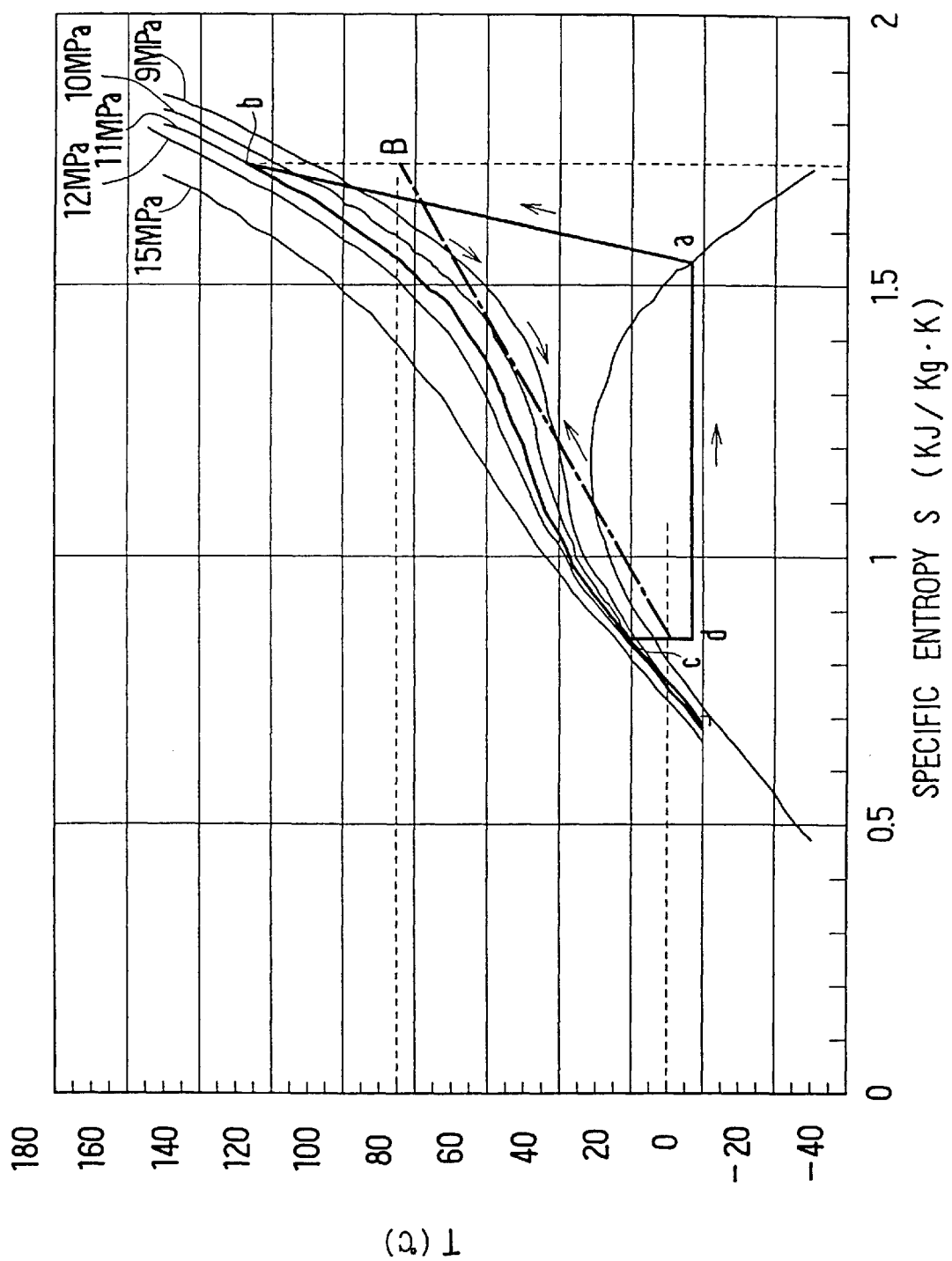
FIG. 8 is another graph of T vs. S.

Namely, as is clear from FIGS. 7 and 8, when the heat exchange efficiency $\eta$ is improved to cause the heat exchange rate in the water heat exchanger 220 to increase, a temperature difference $\Delta T$ between the refrigerant flowing out from the water heat exchanger 220 and water flowing thereinto becomes small. Therefore, in this embodiment, the heat exchange efficiency $\eta$ is improved by controlling the discharge pressure Pd so that the temperature difference $\Delta T$ attains a predetermined level $\Delta T_0$, whereby the efficiency of the heat pump 200 (hot water supply system 100) is improved. When the temperature difference $\Delta T$ is small, the heat exchange rate in the water heat exchanger 220 increases, so that the rotational frequency (the feed rate of hot water to be supplied) of the pump 400 can be increased.

Figure 9:
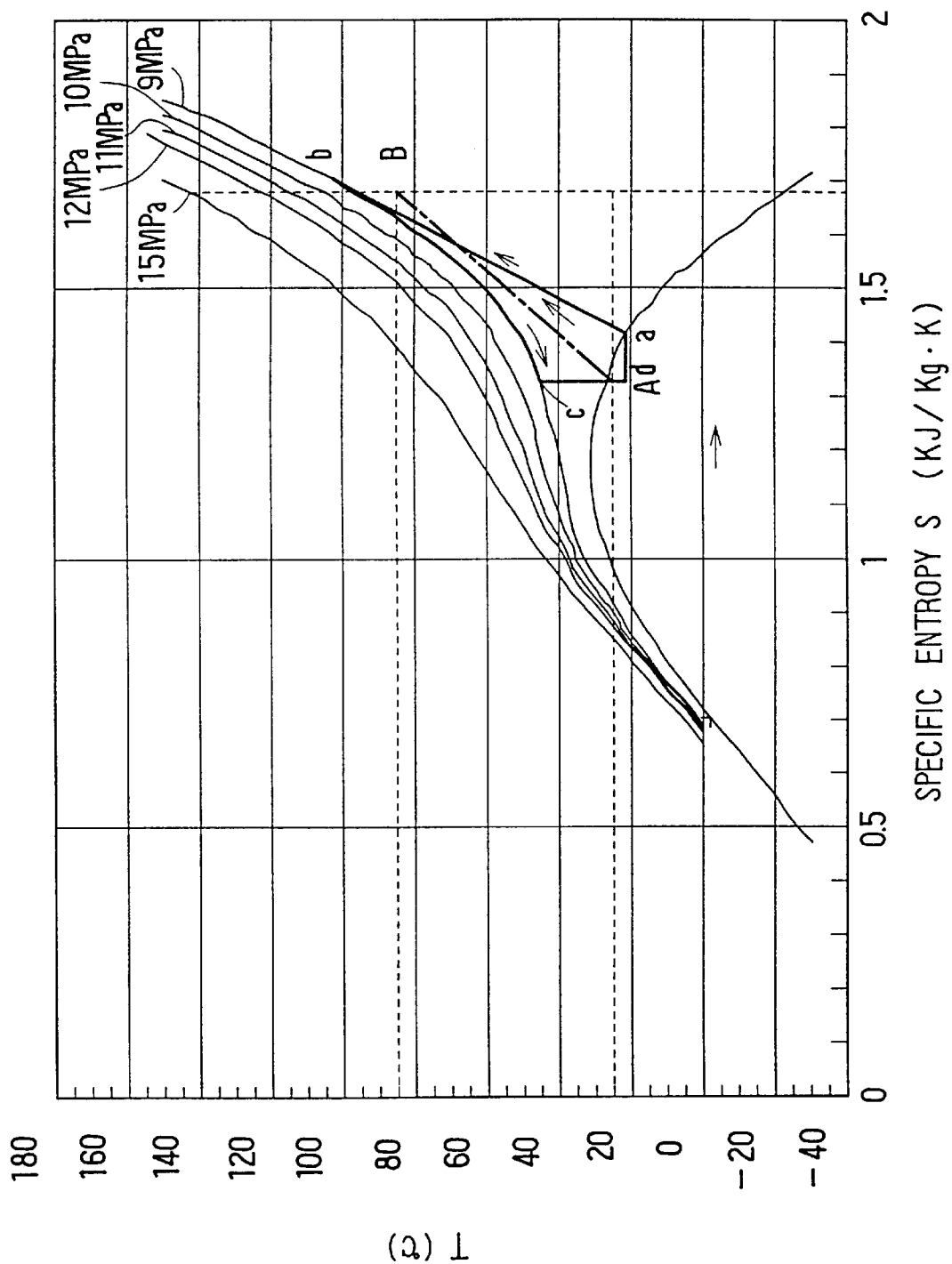
FIG. 9 is another graph of T vs. S.

When the refrigerant pressure on the low-pressure side of the heat pump 200 increases due to, for example, an increase in the temperature of the outside air when the heat pump 200 is operated in the stable condition shown in FIG. 7, the temperature of the refrigerant discharged from the compressor 210 decreases as shown in FIG. 9 when the discharge pressure Pd is identical.

Figure 10:
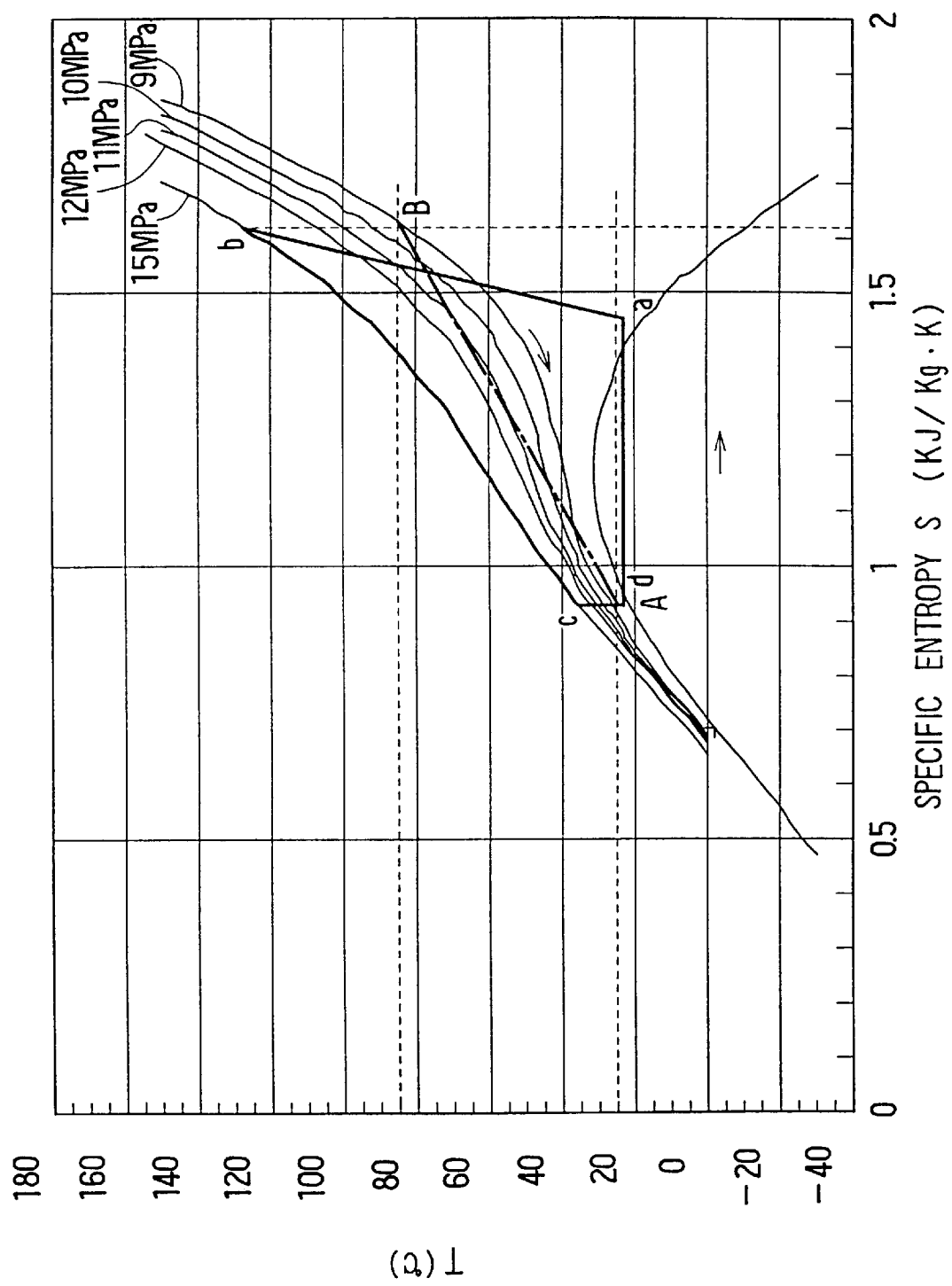
FIG. 10 is another graph of T vs. S.

When the discharge pressure Pd is increased at this time to increase the temperature of the refrigerant discharged from the compressor 210, the discharge pressure Pd increases excessively as shown in FIG. 10. Therefore, this excessive pressure may overcome the pressure resisting strength of the compressor 210 and water heat exchanger 220. Although the pressure resisting strength of the compressor 210 and water heat exchanger 220 may be increased to solve this problem, the cost of manufacturing the hot water supply system 100 would consequently increase.

Figure 11:
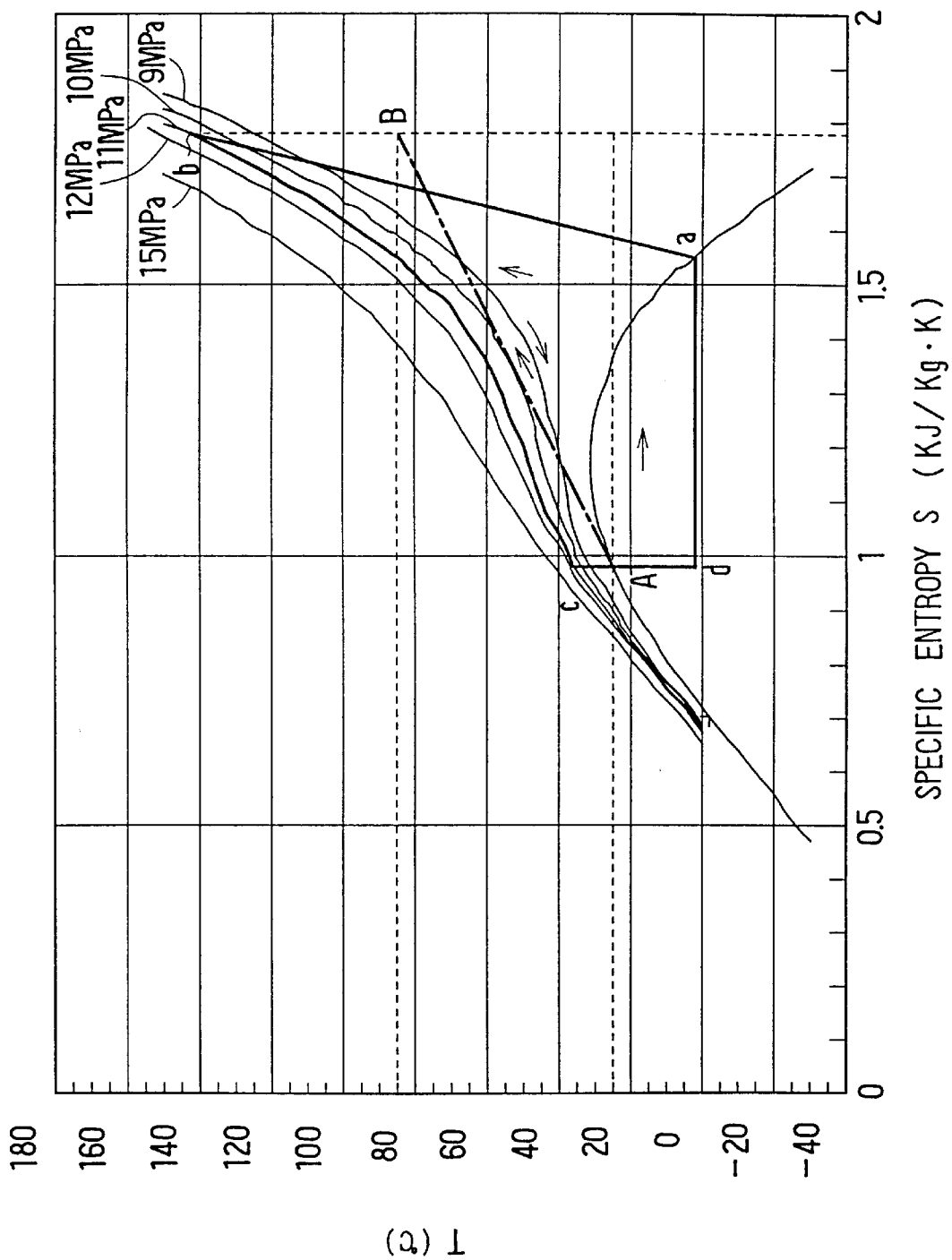
FIG. 11 is another graph of T vs. S.

In the present embodiment, when the discharge pressure Pd is lower than a predetermined level $P_0$, the pressure Pd is controlled so that the temperature difference $\Delta T$ attains a predetermined level $\Delta T_0$. When the discharge pressure Pd has reached the predetermined level $P_0$, the refrigerant pressure on the low-pressure side is controlled so that the temperature difference $\Delta T$ reaches the predetermined level $\Delta T_0$, with the refrigerant temperature maintained at a level greater than or equal to a required level. As a result, an excessive increase in the discharge pressure Pd can be prevented as shown in FIG. 11. Namely, when the refrigerant pressure on the low-pressure side is reduced, the refrigerant temperature can be increased to a level greater than or equal to a required level without causing the refrigerant pressure on the high-pressure side to increase excessively.

Therefore, since it is unnecessary in this embodiment to increase the pressure resisting strength of the compressor 210 and water heat exchanger 220, the hot water supply system 100 (heat pump 200) can be operated efficiently while minimizing an increase in the manufacturing cost.

As is clear from the above description, the predetermined temperature difference $\Delta T_0$ does not have a fixed value, but rather varies depending upon the heating capacity and the refrigerant pressure on the high-pressure side, so that it may be varied in accordance with these conditions.

Since the second openings 350, into and out of which high-temperature hot water flows, of the heat insulating tanks 300 are covered with the heat insulating portions 360 comprising a resin material of a low heat conductivity, the radiation of the heat of the hot water stored in the heat insulating tanks 300 from the second openings 350 to the exterior (into the atmosphere) can be minimized. This enables the heat insulating capacity of the heat insulating tanks 300 to be improved.

As the temperature sensors 370 for detecting the temperature of the hot water in the heat insulating tanks 300 are be vertically spaced from one another, the temperature and volume of the hot water in the heat insulating tanks 300 can be accurately determined. Therefore, operation of the heat pump 200 can be accurately controlled.

In this embodiment, the heat insulating tanks 300 are arranged in parallel with the flow of hot water, and the condition (temperature and volume of hot water) of each heat insulating tank 300 can be regarded as being substantially identical. Thus, the temperature sensors 370 are not provided in each of the plural heat insulating tanks 300, but rather are provided in one heat insulating tank 300. Therefore, the heat pump 200 is controlled based on the condition of the heat insulating tank 300 provided wish the temperature sensors 370 therein.

In this embodiment, the rotational frequency of the pump 400 is controlled based on the temperature detected by the temperature sensor 274. Also, the rotational frequency (supply rate of hot water to the water heat exchanger 220) of the pump 400 may be set to a constant rate without the need to rely upon the operational condition of the heat pump 200.

Figure 12:
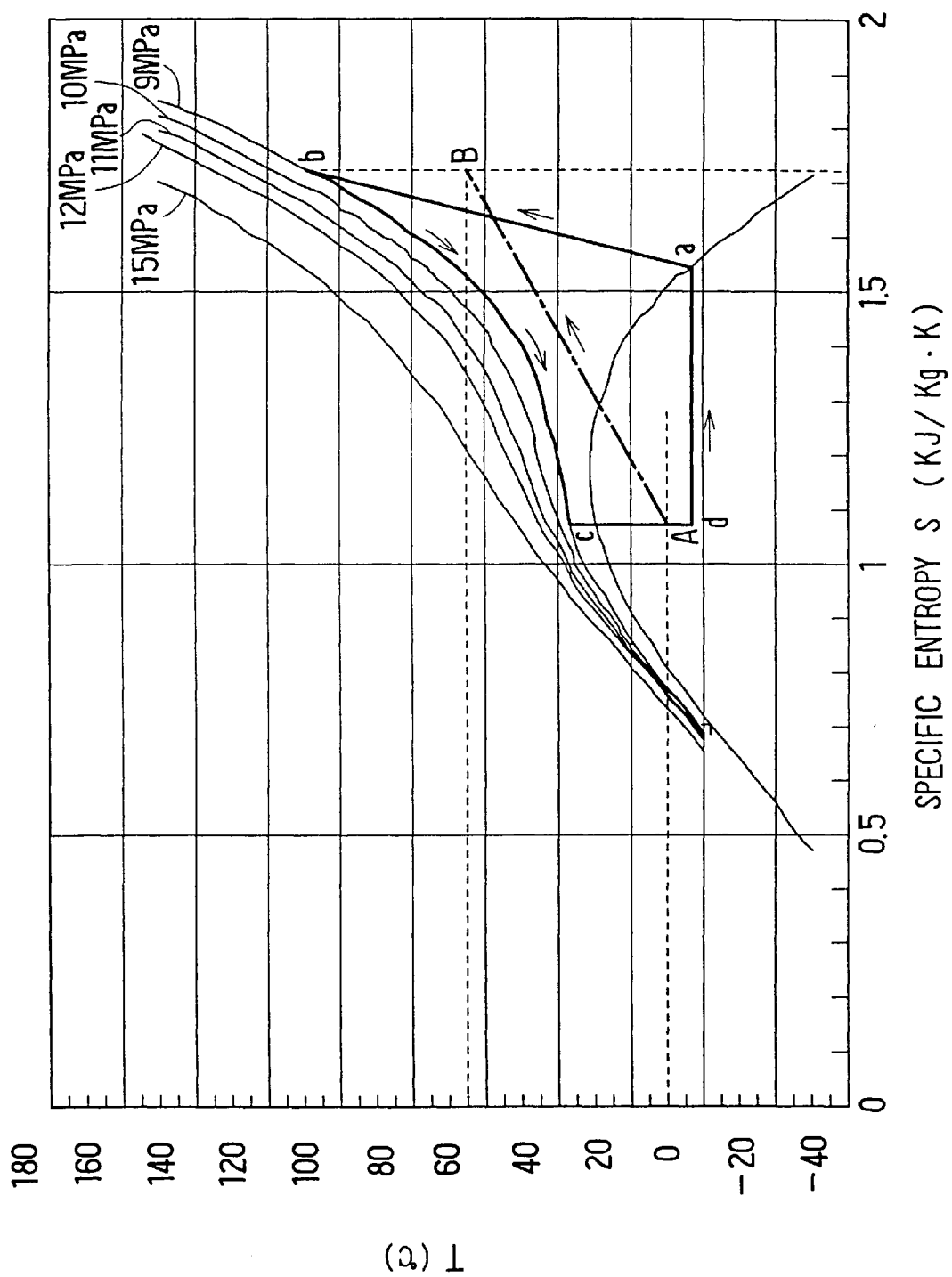
FIG. 12 is another graph of T vs. S.
Figure 13:
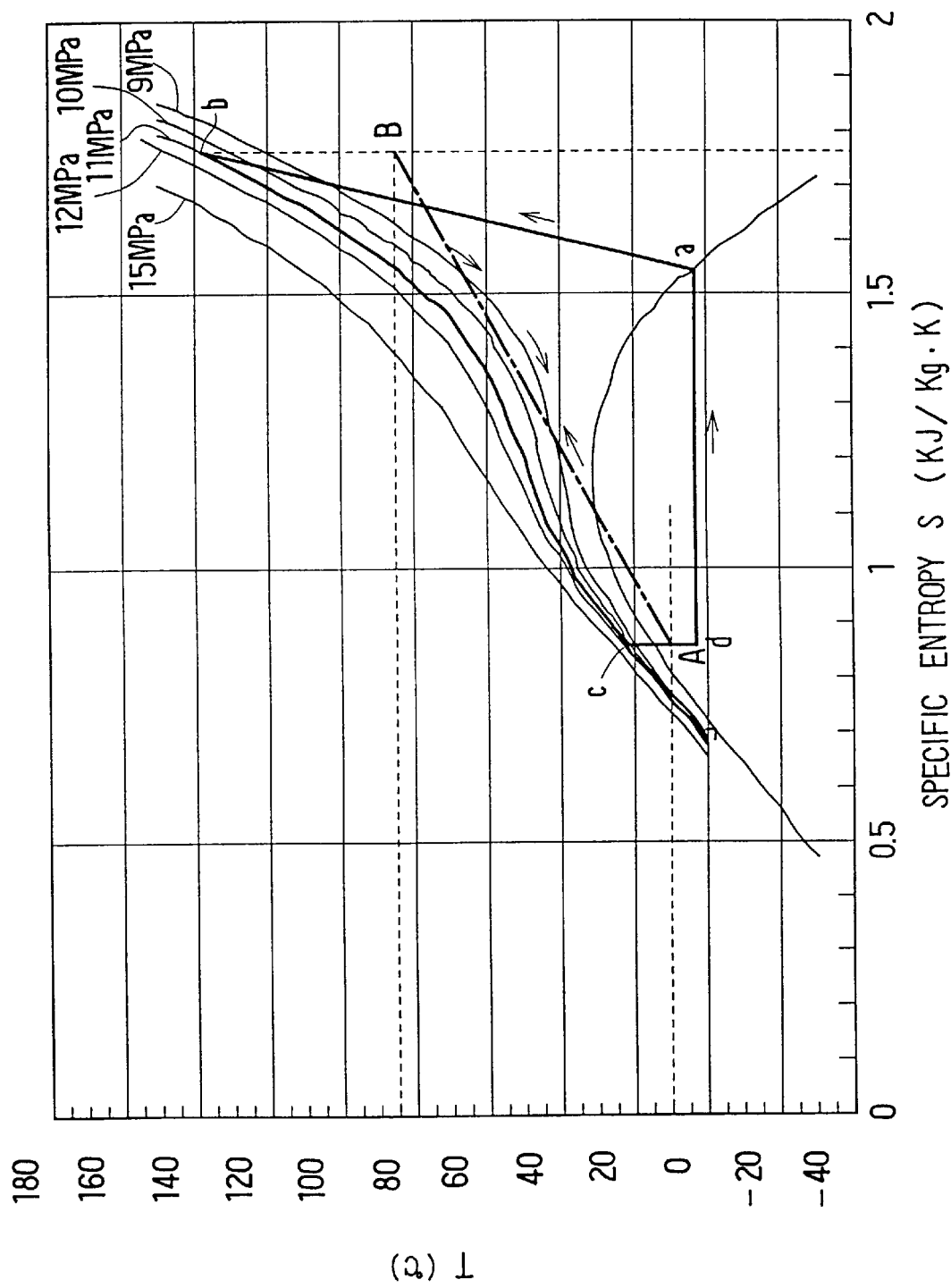
FIG. 13 is another graph of T vs. S.

When the temperature difference $\Delta T$ immediately after starting of the heat pump 200 is large, the discharge pressure Pd as well as the temperature of the hot water flowing out from the water heat exchanger is low as shown in FIG. 12. However, when the expansion valve 230 and compressor 210 are controlled so that the temperature difference $\Delta T$ becomes less than or equal to the predetermined level $\Delta T_0$, the refrigerant pressure on the high-pressure side increases as shown in FIG. 13. Accordingly, the efficiency of the heat pump 200 can be improved by increasing the heat exchange efficiency $\eta$ while obtaining high-temperature hot water.

It is also allowable to fix the rotational frequency of the pump 400, and to provide a throttle, the degree of opening of which is regulatable, in a pump flow passage to control the flow rate of the hot water.

(Second Embodiment)

In the above-described first embodiment, the refrigerant pressure on the low-pressure side of the heat pump 200 is reduced when it increases due to an increase in the temperature of the outside air, and the heat pump 200 is controlled so that the discharge pressure Pd does not exceed the predetermined level $P_0$. In the second embodiment, heat exchange is conducted between the refrigerant between the refrigerant inlet and outlet of a water heat exchanger 220 and the refrigerant sucked into a compressor 210.

Figure 14:
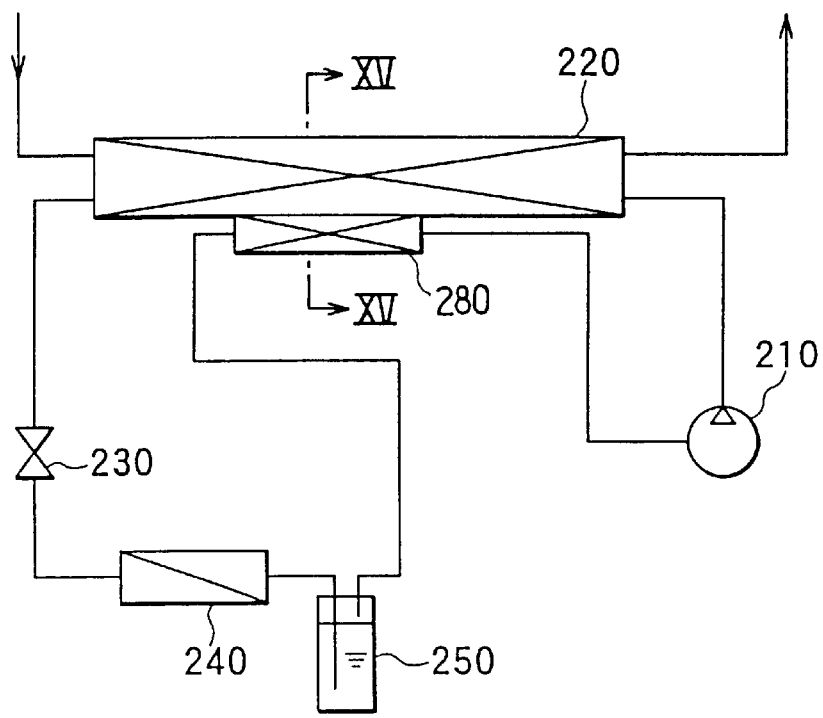
FIG. 14 is a schematic diagram showing a heat pump of a second embodiment of the present invention.

FIG. 14 is a schematic diagram showing a heat pump 200 alone in a hot water supply system 100 of this embodiment.

A refrigerant heat exchanger 280 conducts heat exchange between the refrigerant existing between the refrigerant inlet and outlet of the water heat exchanger 220 and the refrigerant sucked into the compressor 210.

Figure 15:
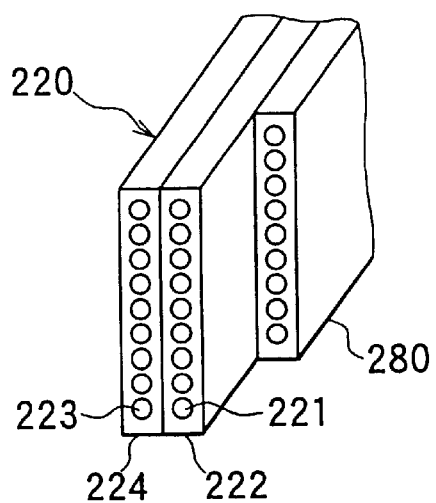
FIG. 15 is a perspective view showing a cross section taken along line XV—XV in FIG. 14.

FIG. 15 is a perspective view showing a section taken along line XV—XV in FIG. 14. As shown, the water heat exchanger 220 comprises a refrigerant side multi-hole-carrying tube 222 provided with a plurality of holes 221 through which the refrigerant is circulated, and a hot water side multi-hole-carrying tube 224 provided with a plurality of holes 223 through which the hot water flows. The refrigerant heat exchanger 280 has the same structure as the refrigerant side multi-hole-carrying tube 222, and is joined thereto. The two multi-hole-carrying tubes 222, 224 and refrigerant heat exchanger 280 are molded by subjecting aluminum to an extrusion or drawing process.

The characteristics of this embodiment will now be described. When the temperature of the outside air is high during summer, the refrigerant pressure on the low-pressure side of the heat pump 200 increases. Therefore, to obtain hot water of a temperature of greater than or equal to the predetermined level (85° C.), it is necessary that the discharge pressure Pd be increased as well in accordance with an increase in the refrigerant pressure on the low-pressure side as shown by a-b-c-d in FIG. 16.

Figure 16:
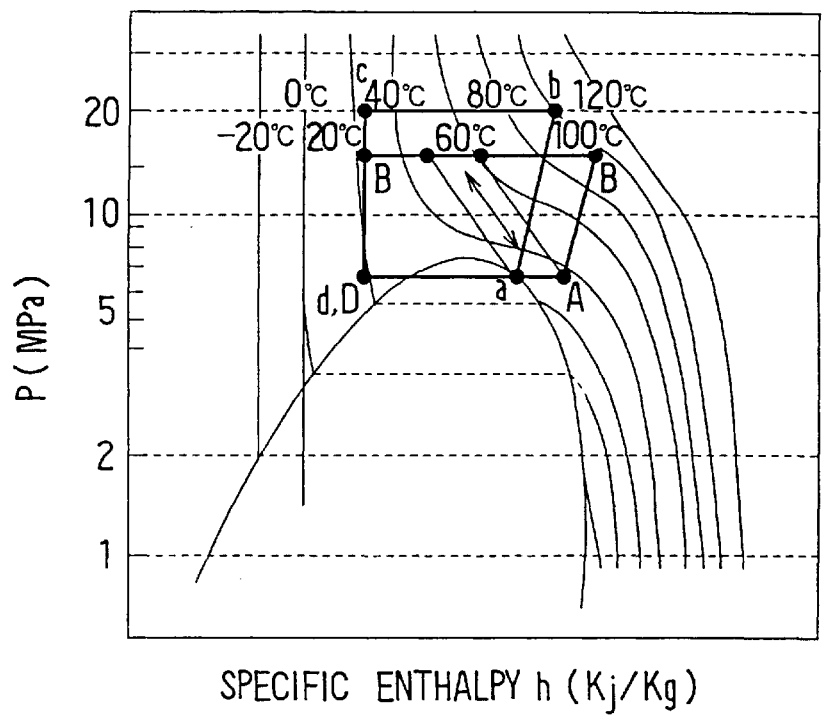
FIG. 16 is a graph of Pd(pressure) vs. h(specific enthalpy) for refrigerant used in the system of the present invention.

When heat exchange is conducted as mentioned above between the refrigerant sucked into the compressor 210 and the refrigerant existing between the refrigerant inlet and outlet of the water heat exchanger 220, the temperature of the suction refrigerant increases as shown by A-B-C-D in FIG. 16, so that the refrigerant temperature on the discharge side of the compressor 210 can be increased without causing the discharge pressure Pd to increase. Accordingly, it is unnecessary to increase the pressure resisting strength of the compressor 210 and water heat exchanger 220, so that an increase in the cost of manufacturing the hot water supply system 100 can be minimized.

In this embodiment, the discharge temperature is increased, as an increase in the discharge pressure Pd is suppressed, by increasing the temperature of the suction refrigerant. Therefore, increasing the temperature of the suction refrigerant by subjecting the suction refrigerant and the refrigerant from the water heat exchanger 220 to heat exchange is conceivable.

However, in the heat pump 200, the refrigerant in the water heat exchanger 220 is circulated so as to have a temperature gradient in which the temperature thereof decreases gradually from the refrigerant inlet toward the refrigerant outlet as mentioned above, so that a temperature difference between the discharge refrigerant and the hot water flowing into the water heat exchanger 220 is small.

Since the temperature of the outside air is high, a temperature difference between the refrigerant (suction refrigerant) in an evaporator 240 and the outside air is also small.

Therefore, the device for conducting heat exchange between the discharge refrigerant and suction refrigerant is not capable of sufficiently increasing the temperature of the suction refrigerant, thus possibly causing the discharge pressure Pd to increase excessively.

Increasing the temperature of the suction refrigerant by subjecting the refrigerant which is going to flow into the water heat exchanger 220 and the suction refrigerant is conceivable but, when such a device is used, the temperature of the refrigerant flowing into the water heat exchanger 220 decreases, and hot water of a predetermined temperature cannot be obtained.

Figure 17:
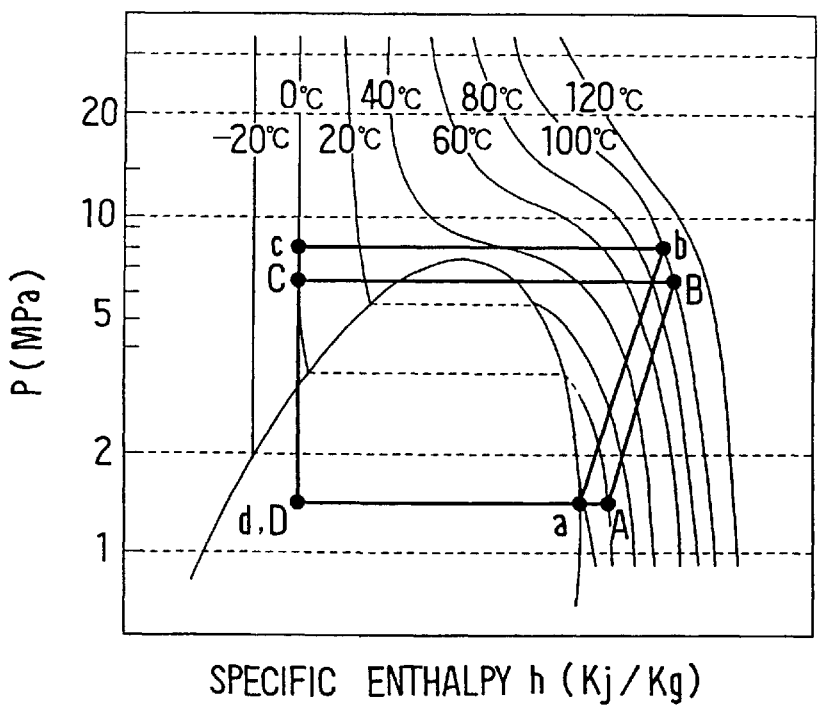
FIG. 17 is another graph of Pd vs. h.

The present embodiment can be utilized not only in summer during which the temperature of the outside air is high but also in spring, autumn and winter in which the temperature of the outside air is not so high (refer to FIG. 17).

Figure 18:
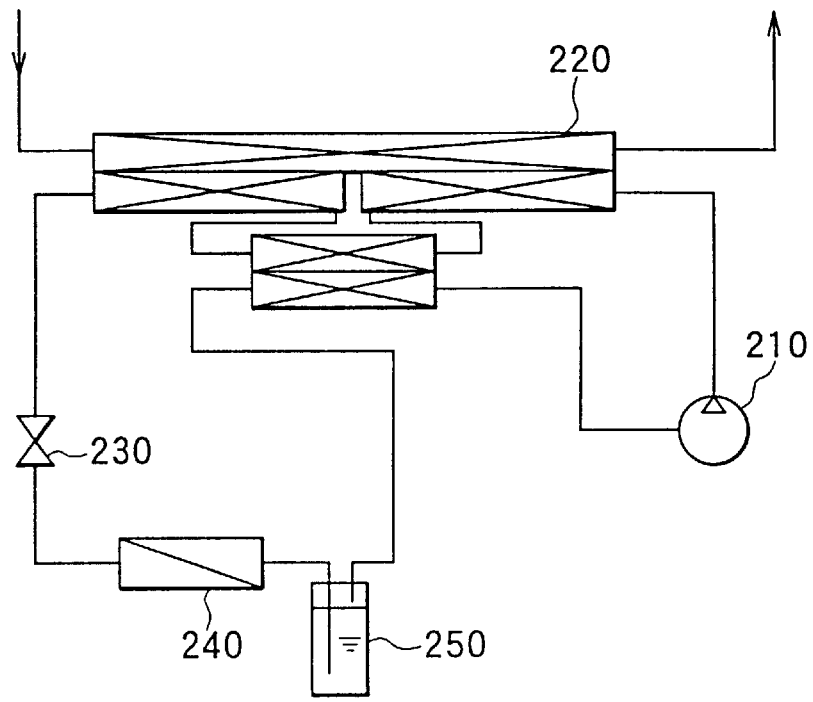
FIG. 18 is a schematic diagram showing a heat pump of a modified example of the second embodiment of the present invention.

In this embodiment, the suction refrigerant is heated with the refrigerant circulated through the water heat exchanger 220 by bringing the refrigerant heat exchanger 280 into direct contact with the refrigerant side of the multi-hole-carrying tube 222. As shown in FIG. 18, this embodiment may also be formed so that the refrigerant circulated through the water heat exchanger 220 is taken out therefrom during circulation thereof and subjected to heat exchange with the suction refrigerant.

Figure 19:
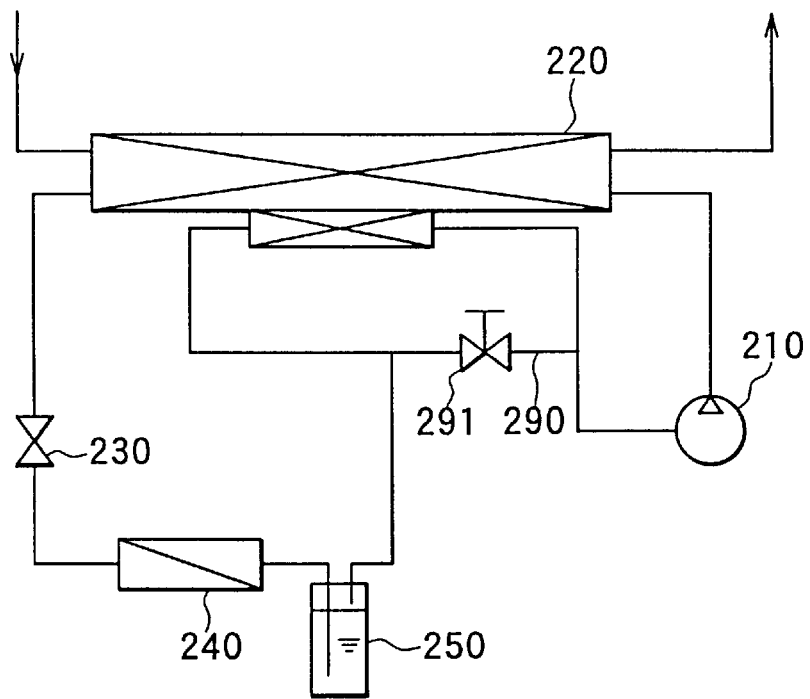
FIG. 19 is a schematic diagram showing a heat pump of a modified example of the second embodiment of the present invention.
Figure 20:
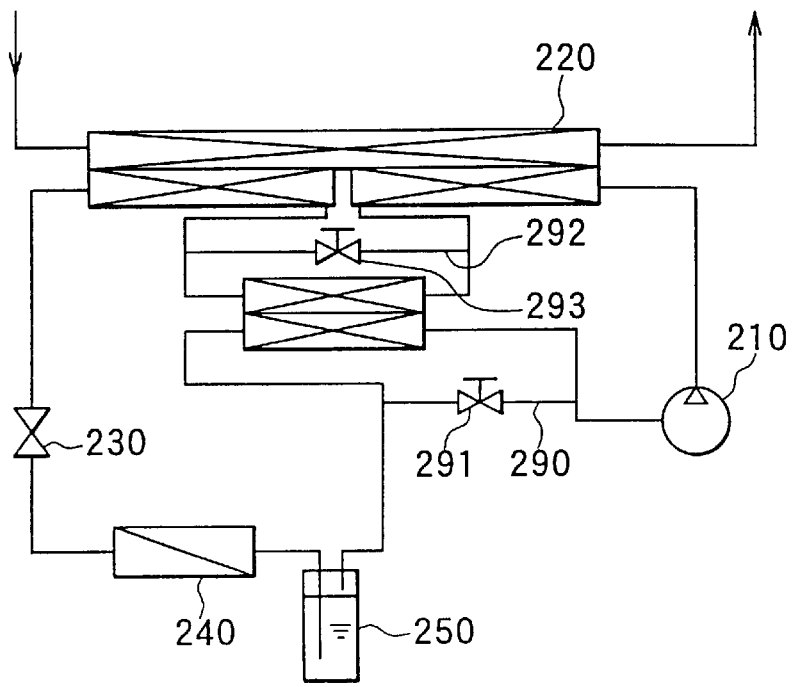
FIG. 20 is a schematic diagram showing a heat pump of a modified example of the second embodiment of the present invention.

As shown in FIGS. 19 and 20, a bypass passage 290 for introducing the refrigerant, which flows out from the accumulator 250, into the suction side of the compressor 210 via a long way around the refrigerant heat exchanger 280, and an electromagnetic valve. 291 for closing this bypass passage 290 may be provided.

When the temperature of the outside air is high in the summer, the suction refrigerant is heated with the electromagnetic valve 291 closed. When the temperature of the outside air is not so high in the spring, autumn and winter, it is preferable to stop heating of the suction refrigerant with the electromagnetic valve 291 opened.

FIG. 19 shows an example in which a bypass passage 290 is provided in the same heat pump 200 as shown in FIG. 14, and FIG. 20 shows an example in which a bypass 290 is provided in the same heat pump 200 shown in FIG. 18.

In the heat pump 200 shown in FIG. 18, a bypass passage 290 and an electromagnetic valve 291 may be provided in the refrigerant passage extending from the water heat exchanger 220 to the refrigerant heat exchanger 280 to control an operation for determining whether the suction refrigerant should be heated.

(Third Embodiment)

In the second embodiment, heat exchange is conducted in the refrigerant heat exchanger 280 between the refrigerant between the refrigerant inlet and outlet of the water heat exchanger and the refrigerant sucked into the compressor 210. In the third embodiment, a heat exchange rate in a refrigerant heat exchanger 280 is controlled based on the condition of the refrigerant on the discharge side of a compressor 210.

Figure 21:
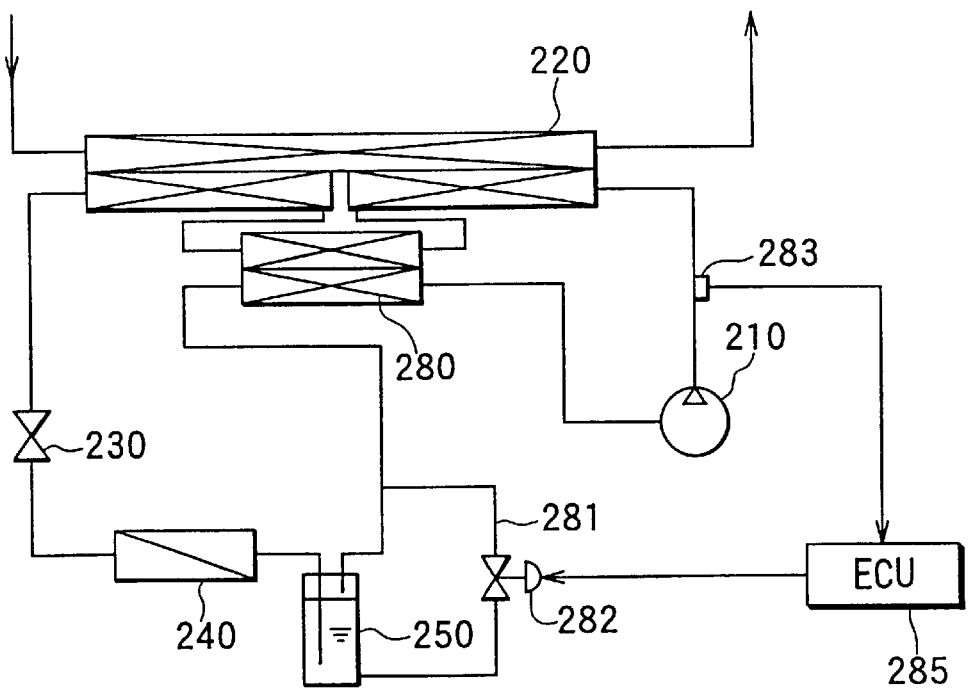
FIG. 21 is a schematic diagram showing a heat pump of a third embodiment of the present invention.

Referring to FIG. 21, in this embodiment, a refrigerant passage 281 for introducing a liquid-phase refrigerant collected in a bottom portion of an accumulator 250 into the refrigerant flowing out thereof, and an electric flow rate regulating valve 282 for regulating the communication condition of the refrigerant passage 281 are provided.

The compressor 210 is provided on the discharge side thereof with a temperature sensor 283 for detecting the temperature of the discharge refrigerant, and a detected temperature is input into an electronic control unit (ECU) 285 adapted to control the flow rate regulating valve 282.

The operation of this embodiment will now be described. In the second embodiment, heat exchange is conducted in the refrigerant heat exchanger 280 between the refrigerant between the refrigerant inlet and outlet of the water heat exchanger 220 and that sucked into the compressor 210, so that a heat exchange rate is determined based on the capacity of the refrigerant heat exchanger 280.

Therefore, if the capacity of the refrigerant heat exchanger 280 is determined when summer temperatures cause the ambient air to be high, the degree to which the suction refrigerant is heated during low temperature becomes high (refer to FIGS. 16 and 17) as compared to a period of time in which the temperature of the outside air is high, so that the temperature of the discharged refrigerant becomes higher than necessary.

When a temperature detected by a temperature sensor 283 has become higher than a predetermined level (about 100° C. when hot water of 85° C. is obtained), the degree of opening of the flow rate regulating valve 282 is increased to increase the supply rate of the liquid-phase refrigerant sent from the accumulator 250 to the refrigerant heat exchanger 280, to thereby prevent the degree of heating of the suction refrigerant from becoming higher than necessary.

When the temperature detected by the temperature sensor 283 is less than or equal to a predetermined level, the degree of opening of the flow rate regulating valve 282 is reduced to lower the supply rate of the liquid-phase refrigerant sent from the accumulator 250 to the refrigerant heat exchanger 280, and to thereby prevent the degree of heating the suction refrigerant from becoming lower than necessary.

Since the above operation enables the discharge temperature to be maintained at a predetermined level independent of the temperature of the outside air, hot water of a predetermined temperature can be supplied in a stable manner as an excessive increase in the discharge pressure Pd is prevented.

(Fourth Embodiment)

Figure 22:
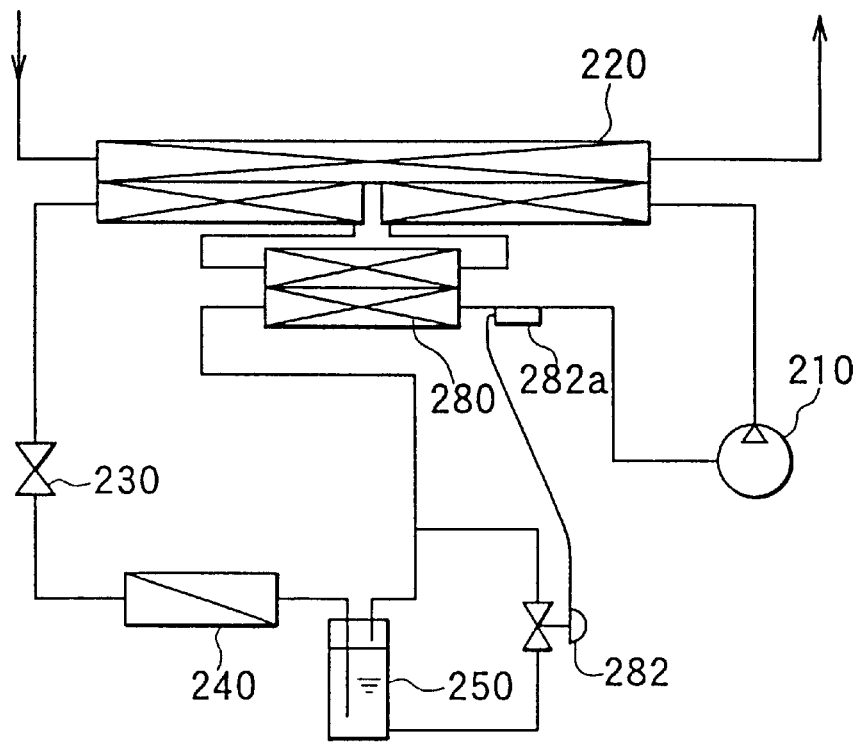
FIG. 22 is a schematic diagram showing a heat pump of a fourth embodiment of the present invention.

In the third embodiment, an increase in the temperature of the discharge refrigerant to a level higher than necessary is electronically prevented by the temperature sensor 283 and flow rate regulating valve 282. Referring specifically to FIG. 22, the fourth embodiment mechanically prevents the temperature of the discharge refrigerant from increasing to a level higher than necessary based on the fact that isoentropic curves become substantially parallel on a gas-phase region side of a saturated air line.

This embodiment has a flow rate-regulating valve 282 with a temperature sensing cylinder 282a such as a known temperature-type expansion valve used in a heat pump cycle using freon as a refrigerant. The supply rate of the liquid-phase refrigerant sent from an accumulator 250 to the refrigerant heat exchanger 280 is regulated by the flow rate regulating valve 282 so that the degree of heating between an outlet side of a refrigerant heat exchanger 280 and an inlet side of a compressor 210 reaches a predetermined level.

The structure of the fourth embodiment thus enables system manufacturing costs to be reduced, and enables hot water of a predetermined temperature to be supplied in a stable manner while preventing the discharge pressure Pd from increasing excessively.

(Fifth Embodiment)

In the first embodiment, the temperature difference $\Delta T$ between the refrigerant flowing from the water heat exchanger 220 and the water flowing thereinto is controlled by varying the degree of opening of the expansion valve 230. Also, the temperature of hot water at the hot water outlet of the water heat exchanger 220 is controlled by regulating the flow rate of the hot water by the pump 400.

In the fifth embodiment, a temperature difference $\Delta T$ between a refrigerant flowing from a water heat exchanger 220 and the water flowing thereinto is controlled to a predetermined level $\Delta T_0$ by regulating a flow rate of the hot water by a pump 400. The temperature of hot water is controlled by regulating the degree of opening of an expansion valve 230.

The methodology associated with the present embodiment will now be described.

First, the temperature difference $\Delta T$ between the refrigerant flowing out of the water heat exchanger 220 and the water flowing thereinto is detected, and it is determined whether this temperature difference $\Delta T$ is in a predetermined temperature range ($\Delta T_0 \pm \alpha$) centering around a predetermined temperature difference $\Delta T_0$. When the temperature difference $\Delta T$ is in the predetermined temperature range, the flow rate of hot water regulated by the pump 400 is kept constant. When it is not in the predetermined temperature range, i.e., when the temperature of the refrigerant flowing out of the water heat exchanger 220 is higher than that of the water flowing thereinto by a level greater than the predetermined temperature difference $\Delta T_0$, the flow rate of the hot water is increased by the pump 400 so as to lower the temperature of the refrigerant. As a result, the transfer of heat from the refrigerant to the hot water is promoted in the water heat exchanger 220, and the temperature of the refrigerant flowing out of the water heat exchanger 220 decreases. When the temperature difference $\Delta T$ between the refrigerant and the water enters the temperature range centering around the predetermined temperature difference $\Delta T_0$ due to the decrease in the temperature of the refrigerant, the pump 400 maintains the flow rate of the hot water at that time.

The temperature Twh of the hot water at the hot water outlet of the water heat exchanger 220 is then detected, and it is determined whether this temperature Twh corresponds to a set temperature $Tw_0$. When the temperature Twh of the hot water corresponds to the set temperature $Tw_0$, the degree of opening of the expansion valve 230 is retained. When the temperature Twh of the hot water is not higher than the set temperature $Tw_0$, the discharge pressure Pd of the compressor 210 is increased by reducing the degree of opening of the expansion valve 230, to increase the temperature of the refrigerant flowing into the water heat exchanger 220. When the discharge pressure Pd reaches a predetermined level $P_0$ (for example, 15 MPa) during this time, the refrigerant pressure on the low-pressure side is reduced by increasing the rotational frequency of the compressor 210 and/or reducing the airflow rate of a blower 260. This enables the temperature of the refrigerant discharged from the compressor 210 to increase without causing the refrigerant pressure on the high-pressure side to excessively increase.

When the temperature difference $\Delta T$ between the refrigerant and the water does not fall within the temperature range centering around the predetermined temperature difference $\Delta T_0$ after such a refrigerant pressure control operation, the above-mentioned flow rate control of the pump 400 is again performed. Finally, the hot water supply system 100 is put in the condition in which the temperature difference $\Delta T$ between the refrigerant and the water falls within a temperature range centering around the predetermined temperature difference $\Delta T_0$ with the temperature Twh of hot water supplied corresponding to the set level $Tw_0$.

In this embodiment, the pressure Pd of the refrigerant discharged from the compressor 210 is controlled by regulating the degree of opening of the expansion valve 230 so that the temperature Twh of the hot water supplied reaches a set level $Tw_0$. However, when the temperature difference $\Delta T$ between the refrigerant and the water is larger than the predetermined temperature difference $\Delta T_0$, the flow rate of the hot water is increased by operating the pump 400. As a result, the temperature Twh of the hot water also decreases to finally increase the refrigerant pressure on the high pressure side or decrease the refrigerant pressure on the low-pressure side.

Therefore, the control operation in this embodiment can be called a control operation in which at least one of the refrigerant pressure on the high-pressure side and that on the low-pressure side is controlled so that the temperature difference $\Delta T$ between the refrigerant flowing out of the water heat exchanger 220 and the water flowing thereinto attains a level in a range including the predetermined level $\Delta T_0$.

(Sixth Embodiment)

In the first embodiment, the degree of opening of the expansion valve 230 is controlled so that the temperature difference $\Delta T$ between the refrigerant flowing out of the water heat exchanger 220 and the water flowing thereinto reaches the predetermined level $\Delta T_0$.

As described in connection with the first embodiment, it is necessary that the temperature difference $\Delta T$ between the refrigerant flowing from the water heat exchanger 220 and the water flowing thereinto be set to the predetermined level $\Delta T_0$ to improve the heat exchange efficiency of the water heat exchanger 220. An optimum level of the temperature difference $\Delta T$ between the refrigerant and water varies depending upon the heating capacity of the heat pump cycle and the flow rate of the hot water.

In the sixth embodiment, an optimum temperature difference $\Delta T_A$ between the refrigerant and water is computed, and a temperature difference $\Delta T$ between the refrigerant flowing from a water heat exchanger 220 and the hot water flowing thereinto is controlled so that it reaches a level within a predetermined temperature range centering around this optimum temperature difference $\Delta T_A$.

A method of computing the optimum temperature difference $\Delta T_A$ will now be described.

Figure 23:
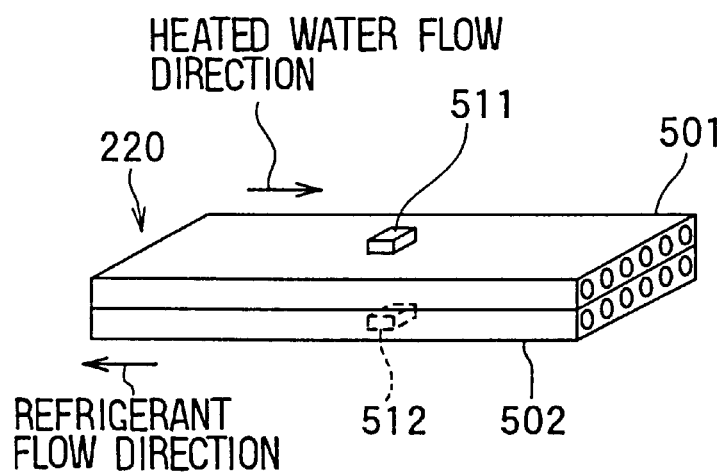
FIG. 23 is a perspective view of a water heat exchanger of a sixth embodiment of the present invention.

As shown in FIG. 23, the water heat exchanger 220 in the sixth embodiment is formed by pasting together a hot water side multi-hole-carrying plate 501 provided with a plurality of holes through which hot water flows, and a refrigerant side multi-hole-carrying plate 502 provided with a plurality of holes through which a refrigerant is circulated. The hot water side and refrigerant side multi-hole-carrying plates 501, 502 are provided at substantially intermediate portions thereof in the flow directions of hot water and refrigerant with temperature sensors 511, 512, which are adapted to detect the temperatures of the hot water and refrigerant which flow in the intermediate portion of the water heat exchanger 220. Accordingly, a temperature difference $\Delta T_H$ between the hot water and refrigerant in the intermediate portion of the water heat exchanger 220 can be determined by computing a difference between the hot water temperature and refrigerant temperature detected by the temperature sensors 511, 512.

Figure 24:
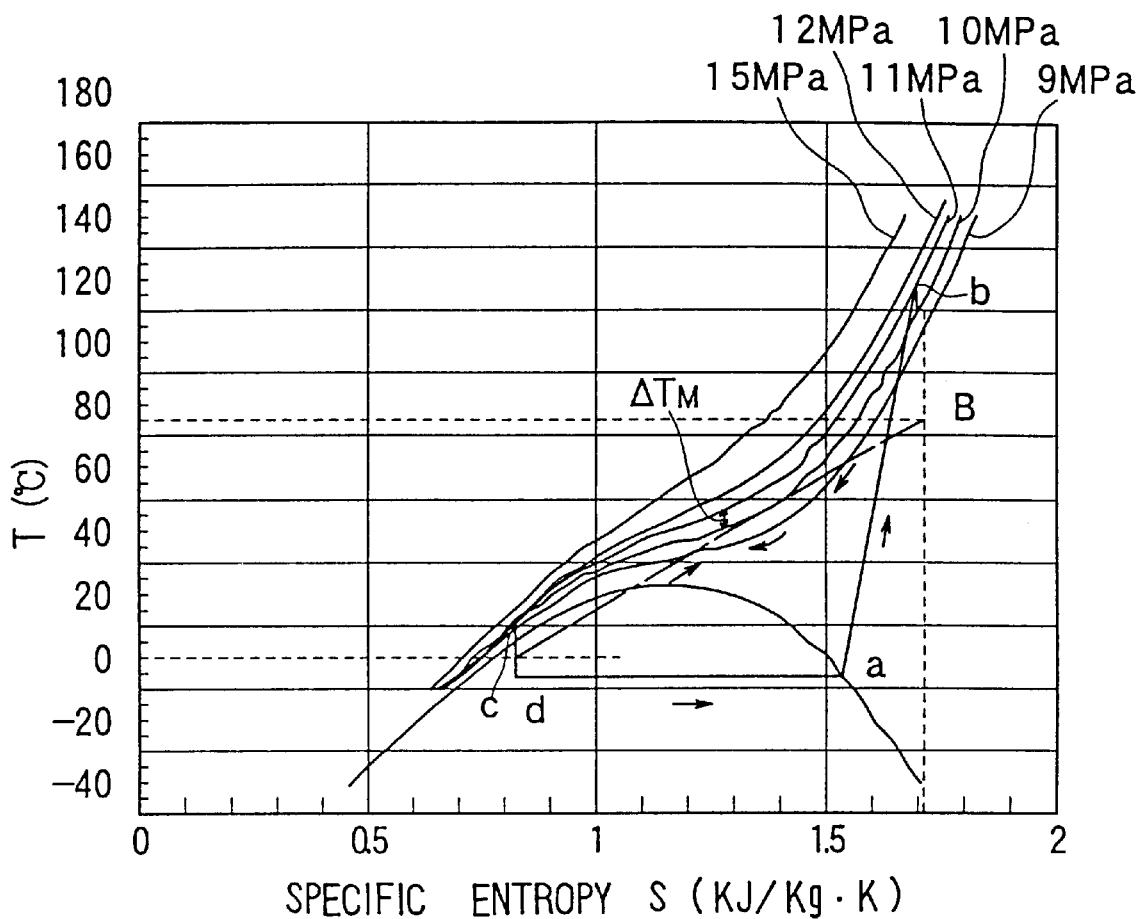
FIG. 24 is a graph showing the relation between specific entropy and temperature in the sixth embodiment.

According to a temperature gradient shown in FIG. 24 in the refrigerant side multi-hole-carrying plate 502, the refrigerant temperature and hot water temperature converge toward one another in the vicinity of the intermediate portion thereof. Specifically, the temperature difference $\Delta T_H$ between the refrigerant and hot water in a position in the vicinity of the intermediate portion of the water heat exchanger 220 is a value most clearly representing the heating capacity of the water heat exchanger 220.

Therefore, when a target value of the temperature difference $\Delta T_0$ between the refrigerant flowing from the water heat exchanger 220 and the water flowing thereinto is set based on the temperature difference between the hot water and refrigerant in a position in the vicinity of the intermediate portion of the water heat exchanger, an optimum temperature difference $\Delta T_A$ can be set as a target value.

Figure 25:
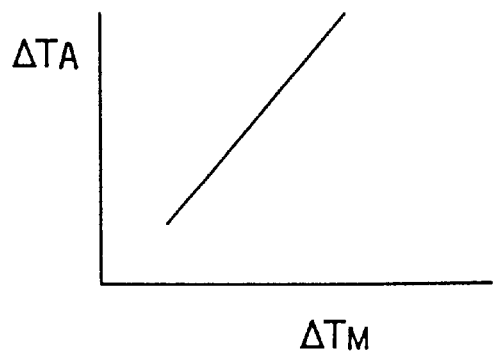
FIG. 25 is a graph showing the relation between a temperature difference $\Delta T_H$, in the vicinity of an intermediate position in a water heat exchanger of the sixth embodiment and an optimum temperature difference $\Delta T_O$.

The temperature difference $\Delta T_H$ in a position in the vicinity of the intermediate portion of the water heat exchanger and optimum temperature difference $\Delta T_A$ have a correlation shown in FIG. 25, and the optimum temperature difference $\Delta T_A$ is therefore determined based on a detected temperature difference $\Delta T_M$ with reference to the relation shown in FIG. 25. When the actually detected temperature difference $\Delta T_0$ is larger than the optimum temperature difference $\Delta T_A$, the degree of opening of an expansion valve 230, airflow rate of a blower 260 and rotational frequency of a compressor 210 are changed to increase the refrigerant pressure on the high-pressure side or reduce the refrigerant pressure on the low-pressure side. As a result, the heat exchange efficiency in the water heat exchanger 220 increases, so that the temperature difference $\Delta T_0$ approaches the optimum temperature difference $\Delta T_A$. When the actually detected temperature difference $\Delta T_0$ is smaller than the optimum temperature difference $\Delta T_A$, an efficient operating condition is not obtained, and the operation of a heat pump cycle 200 is changed by reducing the refrigerant pressure on the high-pressure side or increasing the refrigerant pressure on the low-pressure side.

It is preferable that the optimum temperature difference $\Delta T_A$ be set with consideration given not only to the temperature difference $\Delta T_M$ in the vicinity of the intermediate portion of the water heat exchanger 220, but also to the temperature of the water flowing into the water heat exchanger 220, temperature (temperature of hot water supplied) of the hot water flowing therefrom, and temperature of the refrigerant on the low-pressure side. Therefore, the sixth embodiment is provided with a temperature sensor for detecting the temperature of the refrigerant on the low-pressure side in addition to the structure identical with that of the first embodiment.

There is a tendency for the optimum temperature difference $\Delta T_A$ to become large as, for example, the temperature of the water flowing into the water heat exchanger 220 increases. The optimum temperature difference $\Delta T_A$ also tends to become large as the temperature of the hot water flowing out of the water heat exchanger 220 increases and as the temperature of the refrigerant on the low-pressure side increases. Namely, when these conditions are satisfied, the heat pump cycle 200 is necessarily operated in an inefficient region, so that the heat exchange efficiency decreases to cause the optimum temperature difference $\Delta T_A$ to increase. Therefore, when these parameters are taken into consideration, the optimum temperature difference $\Delta T_A$ can be accurately set.

(Seventh Embodiment)

In the first embodiment, the degree of opening of the expansion valve 230 is controlled so that the temperature difference $\Delta T$ between the refrigerant flowing from the water heat exchanger 220 and the water flowing thereinto reaches the predetermined level $\Delta T_0$. More specifically, when the temperature difference $\Delta T$ is larger than the temperature difference $\Delta T_0$, the heat exchange efficiency of the water heat exchanger 220 is increased by increasing the refrigerant pressure (discharge pressure Pd of the compressor 210), whereby a control operation is carried out to reduce the temperature difference $\Delta T$ to the level $\Delta T_0$.

Figure 26:
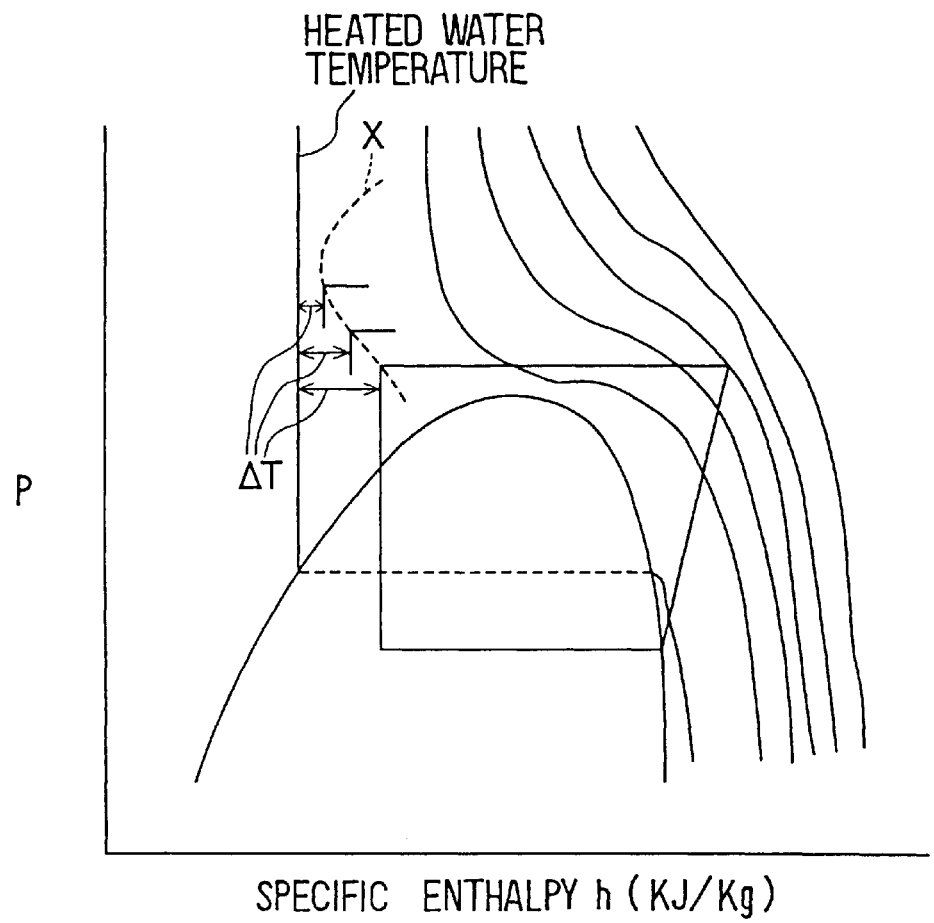
FIG. 26 is a graph showing the relation between specific enthalpy and pressure in a seventh embodiment of the hot water supply system according to the present invention.

As shown by a broken line X in FIG. 26, this temperature difference $\Delta T$ decreases into a certain region when the refrigerant pressure on the high-pressure side is increased. However, it thereafter increases when the refrigerant pressure on the high-pressure side continues to increase. The reasons why this phenomenon occurs are explained as follows.

Since a heat transfer rate $\alpha$ in the water heat exchanger 220 is high in the vicinity of saturation curves, the quantity of heat transferred from the refrigerant to hot water increases and the temperature difference $\Delta T$ decreases as the refrigerant pressure on the high-pressure side increases. However, in a region away from the saturation curves, the heat transfer rate $\alpha$ decreases, so that, no matter how much the refrigerant pressure on the high-pressure side is increased, the heat thereof is not effectively transmitted to the hot water.

Therefore, in the seventh embodiment, an ECU 270 determines whether the temperature difference $\Delta T$ becomes small/large with respect to a decrease/increase in the degree of opening of an expansion valve 230, and determines whether to reduce or increase the degree of opening of the expansion valve 230 in accordance with an actual temperature difference $\Delta T$.

Namely, when the temperature difference $\Delta T$ is higher than the predetermined level $\Delta T_0$ when the temperature difference $\Delta T$ becomes large with respect to a decrease in the degree of opening of the expansion valve 230, or, when $\Delta T$ becomes small with respect to an increase in the degree of opening of the expansion valve, the degree of opening thereof is increased. When the temperature difference $\Delta T$ is lower than the predetermined level $\Delta T_0$ in the same case, the degree of opening of the expansion valve is reduced.

On the other hand, when the temperature difference $\Delta T$ is higher than the predetermined level $\Delta T_0$ when the temperature difference $\Delta T$ becomes small with respect to a decrease in the degree of opening of the expansion valve 230, or, when the temperature difference $\Delta T$ becomes large with respect to an increase in the degree of opening of the expansion valve 230, the degree of opening thereof is reduced. When the temperature difference $\Delta T$ is lower than the predetermined level $\Delta T_0$ in the same case, the degree of opening of the expansion valve 230 is increased.

As a result of the above control, the temperature difference $\Delta T$ between the refrigerant flowing from the water heat exchanger 220 and water flowing thereinto can always be controlled to the level $\Delta T_0$.

(Other Embodiments)

Figure 27:
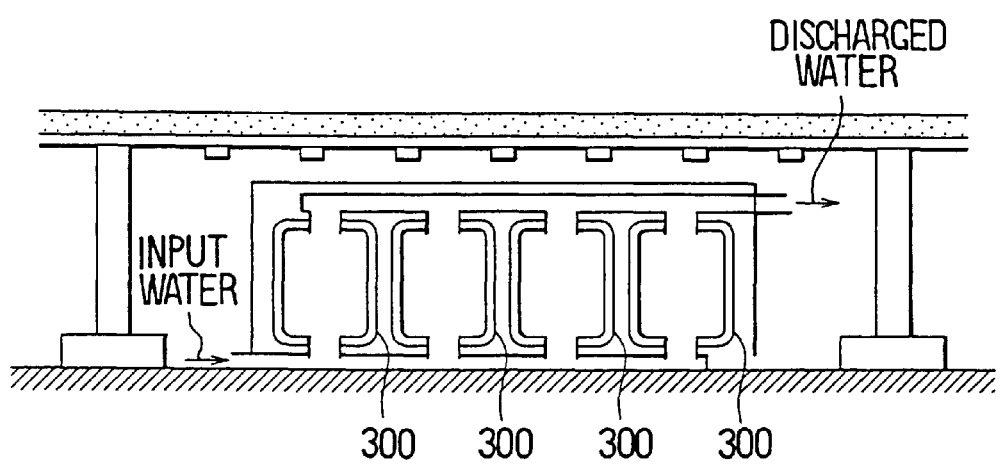
FIG. 27 is a schematic diagram of the heat insulating tanks.

In the above-described embodiments, the heat insulating tanks 300 are adjacent to the heat pump 200 as shown in FIG. 1. The heat insulating tanks 300 may also be provided under a floor of a house as shown in FIG. 27.

Figure 28:
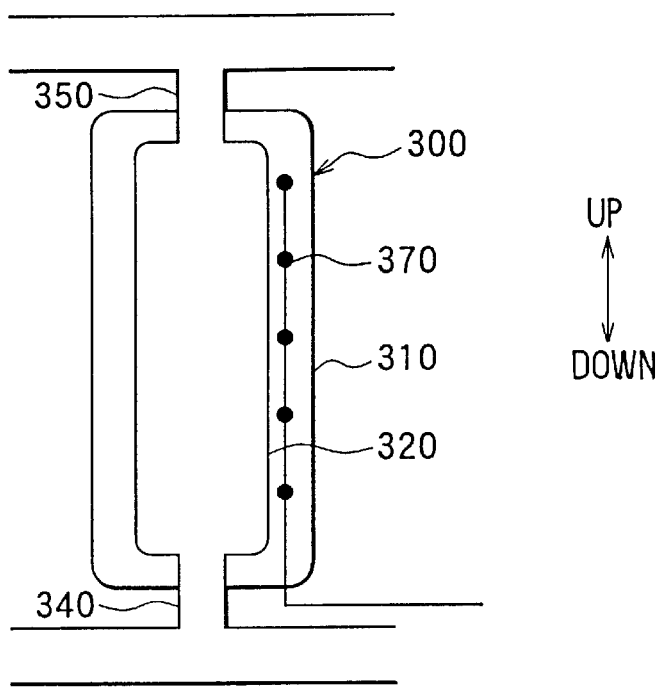
FIG. 28 is a schematic diagram showing the positions of temperature sensors arranged in an exemplary heat insulating tank.

Also, in the above-described embodiments, the temperature sensors 370 are provided in the interior of the inner tank member 320. However, the sensors may also be provided on an outer surface of the inner tank member 320 as shown in FIG. 28.

Figure 29:
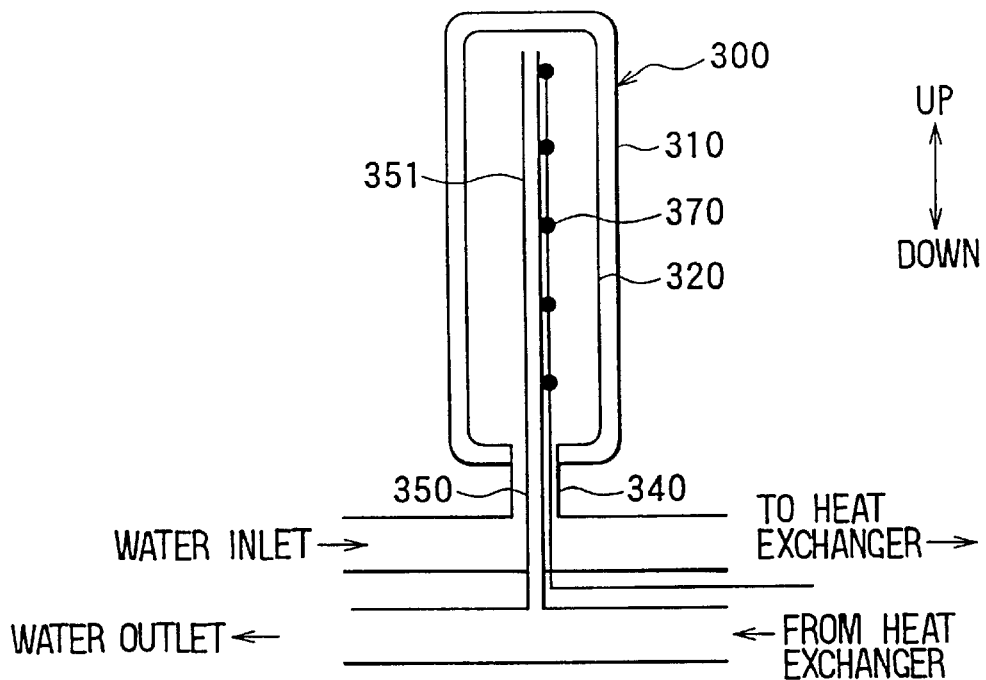
FIG. 29 is a schematic diagram showing the positions of temperature sensors arranged in an exemplary heat insulating tank.

As shown in FIG. 29, both first and second openings 340, 350 may be provided concentrically at lower sides so that the temperature sensors 370 may be fixed on a pipe 351 extending upwardly through the first opening 340.

Figure 30:
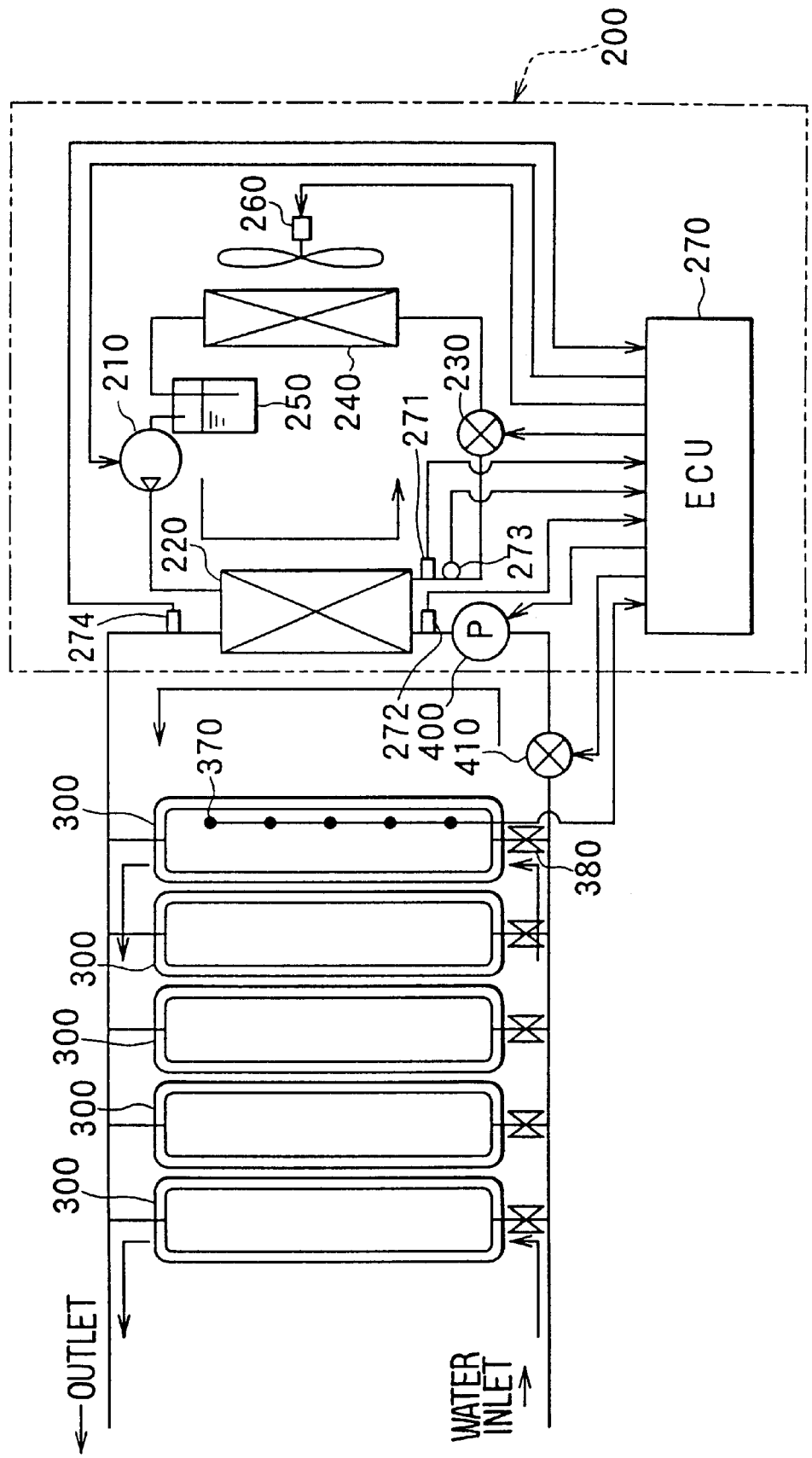
FIG. 30 is a schematic; diagram showing the regulated condition of flow rate regulating valves for the heat insulating tanks.

As shown in FIG. 30, flow rate regulating valves 380 may be provided on the side of first openings 340 so that the flow rates of tap water entering the heat insulating tanks 300 become substantially equal.

Such arrangements can prevent a large difference between conditions in the heat insulating tank provided with the temperature sensors 370 therein and those in heat insulating tanks not provided therewith, so that accurate control of the heat pump 200 may be performed.

Figure 31:
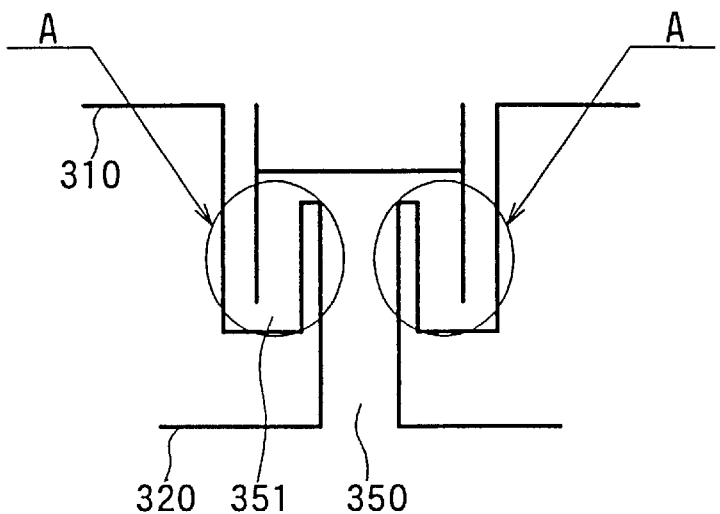
FIG. 31 shows a modified example of a heat insulating section of the present invention.

In the above-described embodiments, the heat insulating portion 360 is formed by a resin. The heat insulating portion 360 may also be formed by vertically bending a passage 351 in a second opening 350 into a labyrinth structure, as shown FIG. 31.

Since the passage 351 in this structure is vertically bent, high-temperature hot water is positioned in an upper section of a portion A of the passage 351, and low-temperature hot water in a lower section thereof. Therefore, the length of the passage 351 increases, and, moreover, natural convection rarely occurs in the passage 351, thus enabling the heat insulating stress of the heat insulating tanks 300 to be improved.

Figure 32:
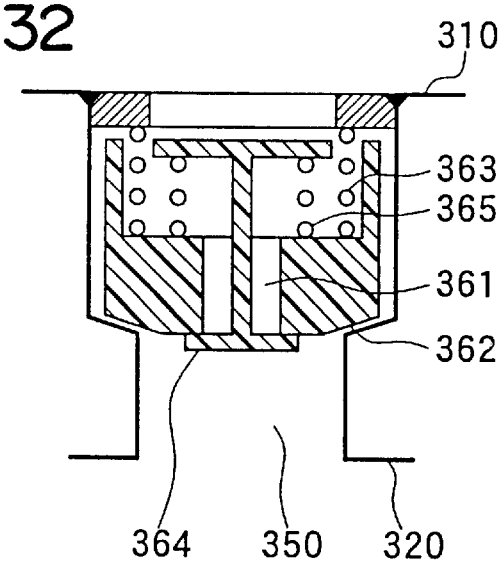
FIG. 32 shows a modified example of a heat insulating section of the present invention.

As shown in FIG. 32, a valve for closing the second opening 350 when hot water is not circulated therethrough may be formed by a material with high heat insulating characteristics, such as a resin.

Referring to FIG. 32, a first valve disc 361 of a resin for closing the second opening 350 is provided with a through passage 362 extending therethrough.

A first coiled spring 363 applies a resilient force directed to close the first opening 350 to an inner side of the relative heat insulating tank 300. A second valve disc 364 of a resin is provided in the portion of the through passage 362 on an inner side of the heat insulating tank 300, and closes or opens the through passage 362. A second coiled spring applies a resilient force directed to close the through passage 362 to the second valve disc 364.

As a result of the above-described structure, the first valve disc 361 is opened when the hot water flows out of the heat insulating tank 300, and the second valve disc 364 when the water heated by the heat pump 200 flows thereinto. Both of the valve discs 361, 364 are closed when the hot water is not circulated.

Figure 33:
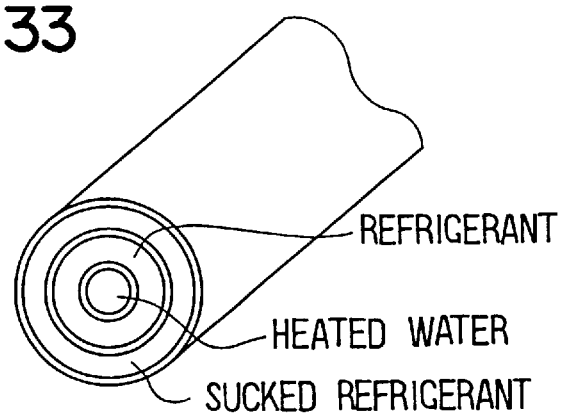
FIG. 33 is an alternate perspective view of a portion corresponding to the portion shown in a cross-sectional view taken along line XV—XV in FIG. 14.

Also, in the second embodiment, each of the water heat exchanger 220 and refrigerant heat exchanger 280 may be a triple cylinder type heat exchanger (FIG. 33).

In the above-described embodiments, water is heated by the heat pump 200. The use of the heat pump 200 is not limited to those described in the above embodiments; i.e., the heat pump 200 may also be used to heat air and other types of fluids.

The above-described embodiments refer to examples in which the water is heated by the heat pump cycle 200 and stored in the heat insulating tanks 300. However, the above-described heat pump cycles 200 can also be applied to hot water supply systems which are other than the above-mentioned types. For example, a system for heating a heat accumulating refrigerant as a hot water generating fluid by the heat pump cycle 200, storing the resultant heat accumulating refrigerant in a heat insulating tank or an open-atmosphere type hot water storage tank, and heating the water by conducting heat exchange between the same and the resultant heat accumulating refrigerant may be utilized. In such an indirect heat exchange type hot water supply system, the hot water to be supplied does not require storage, so that this hot water supply system is highly sanitary. Since, unlike tap water, heat accumulating refrigerant is used with no predetermined pressure applied thereto, the hot water storage tanks for storing the heat accumulating refrigerant need not be high strength tanks such as those required for storing heated city tap water require. Therefore, the cost of manufacturing the hot water storage tanks can be minimized.

While the above description constitutes the preferred embodiment of the present invention, it should be appreciated that the invention may be modified without departing from the proper scope or fair meaning of the accompanying claims. Various other advantages of the present invention will become apparent to those skilled in the art after having the benefit of studying the foregoing text and drawings in conjunction with the following claims.

What is claimed is:

1. A hot water supply system for heating hot water generating fluid by a heat pump cycle in which a refrigerant pressure on a high-pressure side thereof reaches a level greater than or equal to a critical pressures of a refrigerant, comprising:

a compressor for sucking and compressing a refrigerant;

a radiator for subjecting the refrigerant discharged from said compressor and the hot water generating fluid to heat exchange;

a decompressor for decompressing the refrigerant flowing from said radiator;

an evaporator for evaporating the refrigerant flowing from said decompressor, for causing the refrigerant to absorb heat, and for sending the refrigerant toward a suction side of said compressor;

a gas-liquid separator for separating the refrigerant flowing from said evaporator into gas refrigerant and liquid refrigerant; and a refrigerant heat exchanger, disposed between said gas-liquid separator and said compressor, for performing heat exchange between the refrigerant to be sucked into said compressor and the refrigerant in said radiator, wherein:

said refrigerant heat exchanger is disposed to thermally contact said radiator such that a flow direction of the refrigerant flowing through said refrigerant heat exchanger is opposite to a flow direction of the refrigerant flowing through said radiator.

2. The hot water supply system according to claim 1, wherein:

said radiator has a first heat-exchanging member positioned at a refrigerant inlet side of said radiator, a second heat-exchanging member positioned at a refrigerant outlet side of said radiator, and a third heat-exchanging member between said first and second heat-exchanger members; and at least said third heat-exchanger member thermally contacts said refrigerant heat exchanger.

3. A hot water supply system for heating hot water generating fluid by a heat pump cycle in which a refrigerant pressure on a high-pressure side thereof reaches a level greater than or equal to a critical pressure of a refrigerant, comprising:

a compressor for sucking and compressing a refrigerant;

a radiator for subjecting the refrigerant discharged from said compressor and hot water generating fluid flowing therethrough to heat exchange;

a decompressor for decompressing the refrigerant flowing from said radiator;

an evaporator for evaporating the refrigerant flowing from a discharge side of said decompressor, for causing the refrigerant to absorb heat, and for sending the refrigerant toward a suction side of said compressor;

an accumulator for separating the refrigerant flowing from said evaporator into a liquid phase refrigerant and a gas phase refrigerant, and for sending the gas phase refrigerant toward a suction side of said compressor;

a refrigerant heat exchanger for conducting heat exchange between the refrigerant existing between refrigerant inlet and outlet of said radiator and the refrigerant flowing from said accumulator;

a refrigerant passage for guiding the liquid phase refrigerant in said accumulator to said refrigerant heat exchanger; and regulating means for regulating communication of said refrigerant passage; and wherein said regulating means is controlled so that a refrigerant temperature on a discharge side of said compressor reaches a predetermined level.

4. The system of claim 3, wherein said regulating means comprises electronic control means.

5. The system of claim 4, wherein said electronic control means comprises a combination of an electronically controlled valve and a sensor.

6. The system of claim 3, wherein said regulating means comprises mechanical control means.

7. The system of claim 6, wherein said mechanical control means comprises a mechanical sensor valve.

8. A hot water supply system for heating hot water generating fluid by a heat pump cycle in which a refrigerant pressure on a high-pressure side thereof reaches a level greater than or equal to a critical pressure of a refrigerant, comprising:

a compressor for sucking and compressing a refrigerant;

a radiator for subjecting the refrigerant discharged from said compressor and hot water generating fluid flowing therethrough to heat exchange;

a decompressor for decompressing the refrigerant flowing from said radiator;

an evaporator for evaporating the refrigerant flowing from a discharge side of said decompressor, for causing the refrigerant to absorb heat, and for sending the refrigerant toward a suction side of said compressor;

an accumulator for separating the refrigerant flowing from said evaporator into a liquid phase refrigerant and a gas phase refrigerant, and for sending the gas phase refrigerant toward a suction side of said compressor;

a refrigerant heat exchanger for conducting heat exchange between the refrigerant existing between refrigerant inlet and outlet of said radiator and the refrigerant flowing from said accumulator;

a refrigerant passage for guiding the liquid phase refrigerant in said accumulator to said refrigerant heat exchanger; and regulating means for regulating communication of said refrigerant passage and being controlled so that the degree of heating the refrigerant on the suction side of said compressor reaches a predetermined level.

* * * * *